United States Patent
Kanzaki et al.

(10) Patent No.: US 8,249,195 B2
(45) Date of Patent: Aug. 21, 2012

(54) WIRELESS COMMUNICATION APPARATUS WITH A PLURALITY OF ANTENNA ELEMENTS

(75) Inventors: Hajime Kanzaki, Hachioji (JP); Satoshi Tamaki, Kokubunji (JP); Koichiro Furueda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 788 days.

(21) Appl. No.: 12/369,065

(22) Filed: Feb. 11, 2009

(65) Prior Publication Data

US 2009/0207932 A1   Aug. 20, 2009

(30) Foreign Application Priority Data

Feb. 19, 2008   (JP) ................. 2008-037561

(51) Int. Cl.
    *H03K 9/00*   (2006.01)
(52) U.S. Cl. ........................................ 375/316
(58) Field of Classification Search .............. 370/500; 375/227, 232, 260, 267, 316
    See application file for complete search history.

(56) References Cited

U.S. PATENT DOCUMENTS

| | | | | |
|---|---|---|---|---|
| 8,036,295 | B2 * | 10/2011 | Yoshida | 375/267 |
| 2004/0228397 | A1 * | 11/2004 | Bach | 375/232 |
| 2008/0063012 | A1 * | 3/2008 | Nakao et al. | 370/500 |
| 2009/0028271 | A1 * | 1/2009 | Aoki et al. | 375/316 |

OTHER PUBLICATIONS

Jan-Jaap Vande Beek et al., A Time and Frequency Synchronization Scheme for Multiuser OFDM, IIEE Journal on Selected Areas in Communications, Nov. 1999, vol. 17, No. 11.

* cited by examiner

*Primary Examiner* — Leon-Viet Nguyen
(74) *Attorney, Agent, or Firm* — Antonelli, Terry, Stout & Kraus, LLP.

(57) ABSTRACT

A wireless communication apparatus comprising a memory for storing a group of coefficient values to be applied to processing of orthogonal modulation signals received by a plurality of antenna elements, a coefficient generation unit for detecting a phase shift value of reception timing of specific received signals on the basis of a desired signal and the coefficient values read out from the memory, compensating the group of coefficient values according to the detected phase shift value, and storing the compensated coefficient values in the memory, and a signal processing unit for processing the received signals by applying the compensated coefficient values.

10 Claims, 16 Drawing Sheets

AAA WEIGHT TABLE 1350

| ANTENNA NUMBER | SUBCARRIER | | | |
|---|---|---|---|---|
| | $f_0$ | $f_1$ | ... | $f_n$ |
| 1 | w1(0) | w1(1) | ... | w1(n) |
| 2 | w2(0) | w2(1) | ... | w2(n) |
| ⋮ | ⋮ | ⋮ | | ⋮ |

FIG. 17A
PRIOR ART
FIG. 17B
PRIOR ART
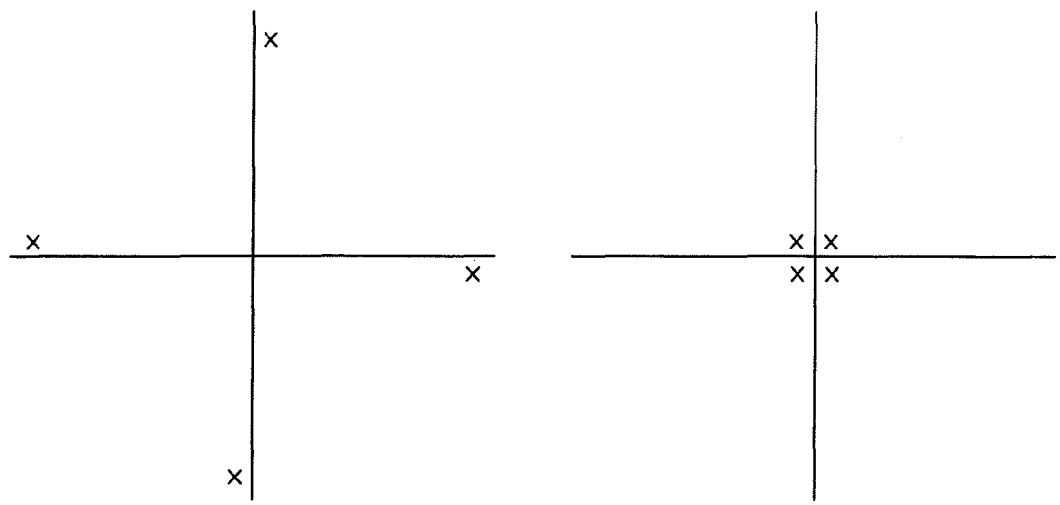
FIG. 18
PRIOR ART
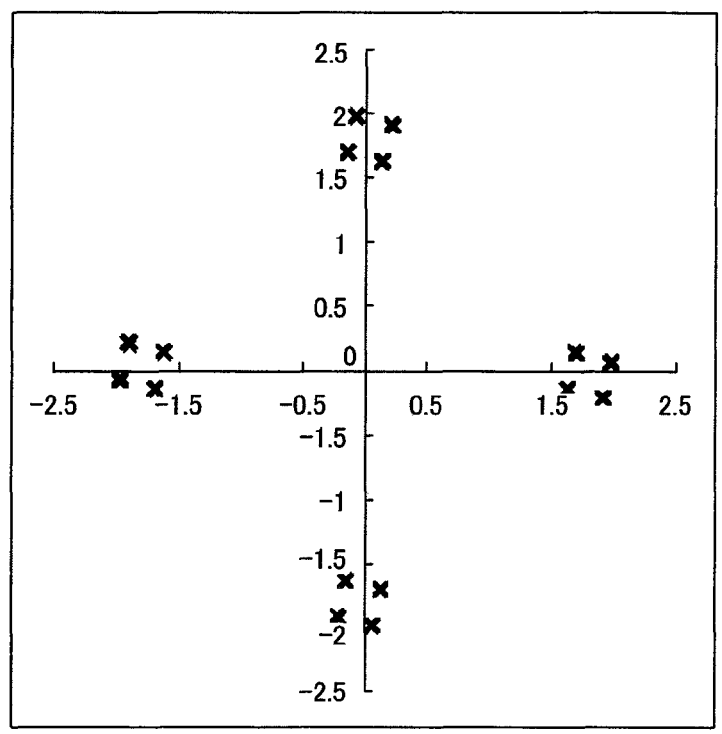

WIRELESS COMMUNICATION APPARATUS WITH A PLURALITY OF ANTENNA ELEMENTS

CLAIM OF PRIORITY

The present patent application claims priority from Japanese patent application JP 2008-037561, filed on Feb. 19, 2008, the content of which is hereby incorporated by reference into this application.

BACKGROUND OF THE INVENTION (1) Field of the Invention

The present invention relates to a wireless communication apparatus, and more particularly to a wireless communication apparatus suitable for use in a base station of an OFDM mobile wireless communication system.

(2) Description of Related Arts

In a digital mobile communication system in which a plurality of mobile stations are connected to a communication network via a base station, it is necessary for the base station to adjust reception timing of each upward frame transmitted from each of the mobile stations to reference timing of the base station. For this reason, when reception timing offset of the upward frame is detected, the base station performs time alignment (TA) control for requesting the mobile station to change the transmission timing.

With the increase in the number of accesses to the Internet from cellular phones and advance of digital processing technology in recent years, a high-speed and large-capacity communication scheme is required in a wireless section of the mobile communication system. OFDMA (Orthogonal Frequency Division Multiple Access) using OFDM (Orthogonal Frequency Division Multiplexing) modulation is noteworthy as a communication scheme satisfying such a requirement.

In OFDM, a multitude of subcarriers different in frequency from each other are used for modulating transmission symbols. In an OFDM transmitter, transmission data are converted into complex symbols in units of a predetermined number of bits by a modulator adopting, for example, QAM (Quadrature Amplitude Modulation), QPSK (Quadrature Phase shift Keying), and so forth. A sequence of complex symbols outputted from the modulator is inputted to an IFFT (Inversed Fast Fourier Transform) unit. The IFFT unit converts a predetermined number of complex symbols having been subjected to serial-parallel conversion into a plurality of complex numbers to be sample values (samples) of OFDM symbols. A plurality of samples forming the OFDM symbols are subjected to parallel-serial conversion and outputted as serial complex baseband OFDM signals from the IFFT unit.

Because a wireless signal transmitted from a transmitter arrives at a receiver, in a separated form as an indirect wave (delayed wave) reflected by an obstacle present on a propagation path and a direct wave unaffected by the obstacle, the receiver needs means for eliminating the influence of the indirect wave.

For that reason, an OFDM transmitter makes copies of a predetermined number of samples extracted from the trailer part of each OFDM symbol and inserts them as a guard interval (GI) in front of the OFDM symbol. The complex baseband OFDM signals having been inserted the GI are inputted to an RF unit and converted into analog serial signals by a D/A converter. The analog serial signals is superimposed on a carrier wave, and transmitted as RF band OFDM signal amplified in power. In an OFDM receiver, the GI is removed from the baseband OFDM signals outputted from an RF unit, and an FFT (Fast Fourier Transform) unit regenerates the original complex symbols by performing serial-parallel conversion, FFT (Fast Fourier Transform) conversion and parallel-serial conversion on the baseband OFDM signals.

In an OFDMA mobile communication system, subcarriers f0 to fn to be used in modulation of transmission data are shared by a plurality of users. The subcarriers f0 to fn are divided into a plurality of sub-channels each comprising a group of subcarriers. Multiple accesses is realized by allocating any one of the sub-channels to each user in time division manner. In the mobile communication system adopting OFDMA, the base station multiplexes communications for a plurality of users in a frequency region.

In the wireless communication using IFFT and FFT, such as OFDMA described above, communication quality deteriorates due to interference between the symbols when an FFT window deviates from a correct position on the receiving station side. For this reason, it is necessary to adjust the position of FFT window according to the time alignment (TA), as proposed in, for example, "A time and frequency synchronization scheme for multiuser OFDM" by J. J. van de Beek, P. O. Borjesson, M. L. Boucheret, D. Landstrom, J. M. Arenas, P. Odling, C. Ostberg, M. Wahlqvist, and S. K. Wilson, IEEE J. Select. Areas Common; vol. 17, pp 1900-1914, November, 1999.

In a cellular mobile communication system, in order to make effective use of frequency resources, frequencies are spatially reused in such a manner that adjacent base stations use carrier frequencies different from each other, while distant base stations use the same carrier frequency. Further, as a technology for avoiding interference between terminal stations being communicating with the same frequency, there is known an adaptive array antenna (AAA) technology that combines reception signals received by a plurality of antennas after weighting with different weights. In the AAA system, adaptive control is adopted so that the reception characteristic of antenna indicates null in the direction of an interference signal and directivity in the direction of a desired signal.

As an AAA combining unit adopted in the OFDMA wireless communication system, there are a Pre-FFT type that performs weighting of reception signals from antennas before FFT processing, and a Post-FFT type that performs weighting for each subcarrier after the reception signals are subjected to the FFT processing.

The Pre-FFT type AAA combining unit can reduce the number of weights to be generated, but it needs to estimate delayed waves in order to generate the weights. Therefore, Pre-FFT type has a drawback such that the antenna characteristic deteriorates when an incoming angle of interference waves spreads. On the other hand, since the Post-FFT type AAA combining unit does not need to estimate the delayed waves although the number of times of calculating weights increases, an excellent antenna characteristic is available even when an incoming angle of interference waves spreads.

The base station in the OFDMA wireless communication system has to adjust transmission timing of upward signals from all terminal stations by the time alignment (TA) control so that transmission signals from respective terminal stations (mobile stations) in a communication state can be received at the FFT window position by the base station. If the transmission timing of upward signal from one of the mobile stations deviates from the timing designated by a TA control signal from the base station, the upward signal received by the base station deviates from the FFT window.

In the case where a reception signal in a time region is expressed by f(t), and a reception signal in a frequency region by g(f), for example, a relationship between f(t) and g(f) can be represented by following expression in DFT (Discrete Fourier Transform):

$$DFT[f(t)] = g(f) \quad (1)$$

Further, on the assumption that the number of sampling points (samples) of DFT is L, and the reception timing of upward signal at the base station deviates by τ samples from the reference timing of FFT window, following expression can be hold:

$$DFT[f(t-\tau)] = \exp\left(-j\frac{2\pi\tau f}{L}\right)g(f) \quad (2)$$

Here, j indicates an imaginary number, and exp( ) an exponential function. These expressions means that, in the case of orthogonal modulation signals, deviation (offset) of reception signal in the time region will show up as phase shift proportional to frequency in the frequency region. Accordingly, if FFT is performed in a state where a reception signal deviates from the FFT window, the FFT unit outputs the reception signal in a state as subjected to phase shift, regardless of the state of delay on the propagation path.

It is assumed that, for example, QPSK signals received by a first antenna and a second antenna are at signal point constellations in the frequency region as shown in FIGS. 17A and 17B, respectively, provided that no delayed wave exists. In this case, if the FFT window has no deviation, the signal point constellation of combined reception signal in the frequency region should be in a state as shown in FIG. 18. Although signal points (x marks) exist for each subcarrier, 16 signal points appear in the figure because a plurality of x marks overlap with each other. If the reception timing of upward signal deviates by one sample from the FFT window, as the signal point offset appears for each subcarrier, the signal point constellation of the combined reception signal in the frequency region will become, for example, in a state as shown in FIG. 19.

SUMMARY OF THE INVENTION

Because the deviation of FFT window appears as phase shift for each subcarrier in OFDMA, the weight to be applied to each subcarrier is affected by the phase shift in the base station provided with a Post-FFT type AAA combining unit. Even in the case of Post-FFT type AAA combining unit, influence of phase shift described above can be avoided if a weight-optimization algorithm for generating new weights for each frame is adopted.

However, in the case where a recursive type weight-optimization algorithm, such as LMS (Least Mean Squares) algorithm and RLS (Recursive Least Squares) algorithm, that revises weight values having been used in a reception processing of preceding frame and uses the revised weight values to a reception processing of a succeeding frame is applied to the Post-FFT type AAA combining unit, influence of phase shift described above is not avoidable.

A conventional AAA combining unit to which a recursive algorithm is applied can truck moderate variation in the reception timing of frames. However, in the case where the reception timing of frames varies instantaneously at the base station as a result of, for example, switching over of the transmission timing by the mobile station in response to the TA control, the conventional AAA combining unit cannot respond immediately to discontinuous variations in weight values that occur in each subcarrier caused by the phase shift.

It is an object of the present invention to correct coefficient values, such as weight values to be applied to reception signals, into adequate values in a short time when reception timing of a wireless frame deviates in a wireless communication apparatus for transmitting and receiving orthogonal modulation signals.

Another object of the present invention is to compensate weight values into adequate values in a short time when reception timing of a communication frame deviates in a wireless communication apparatus that needs weighting to a plurality of orthogonal modulating signal sequences received from a plurality of antenna elements.

Still another object of the present invention is to provide an OFDM wireless communication apparatus provided with an adaptive array antenna (AAA) and an AAA combining unit capable of outputting signals compensated in phase shift even when reception timing of frame has deviated.

A further object of the present invention is to provide an MIMO wireless communication apparatus provided with a channel estimation unit capable of outputting signals compensated in phase shift even when reception timing of frame has deviated.

In order to accomplish the objects, a wireless communication apparatus according to the present invention comprises: a plurality of antenna elements for receiving orthogonal modulation signals as wireless signals; a plurality of received signal conversion units for converting the wireless signals received by the antenna elements into baseband received signals; a memory for storing a group of coefficient values necessary in processing of received signals outputted from the received signal conversion units; a coefficient generation unit for temporarily storing specific received signals outputted from the received signal conversion units, detecting an offset value of reception timing of the specific received signals on the basis of a desired signal already known and the group of the coefficient values read out from the memory, compensating the group of coefficient values according to the detected offset value of the reception timing, and storing the compensated coefficient values in the memory; and a signal processing unit for processing the received signals outputted from the received signal conversion units by applying the compensated coefficient values stored in the memory.

One of the features of the present invention resides in that the coefficient generation unit detects a phase shift value of the specific received signals, and identifies the offset value of the reception timing from the phase shift value.

According to the first embodiment of the present invention, the coefficient generation unit changes a phase shift value which is variable depending on the offset value of the reception timing, by a predetermined unit value within a predetermined range, compensates the group of coefficient values stepwise in accordance with the phase shift value, compares the desired signal with a candidate signal obtained by applying the compensated coefficient values to the specific received signals, and identifies the reception timing offset value of the specific received signals from the phase shift value at which an error between the desired signal and the candidate signal has a minimum value.

According to the second embodiment of the present invention, the coefficient generation unit generates a test signal having been subjected to phase shift by applying the group of coefficient values to the specific received signals, compares the desired signal with a candidate signal obtained by compensating the phase shift value of the test signal stepwise by a predetermined unit value, and identifies the reception timing offset value of the specific received signals from the phase shift value at which an error between the desired signal and the candidate signal has a minimum value.

According to the third embodiment of the present invention, the coefficient generation unit changes repeatedly a phase shift value which is variable depending on the offset value of the reception timing, by a predetermined unit value within a predetermined range, compensates the group of coefficient values stepwise in accordance with the phase shift value, compares the specific received signals with a temporary received signal obtained by applying the compensated coefficient values to the desired signal, and identifies the reception timing offset value of the specific received signals from the phase shift value at which an error between the desired signal and the temporary received signal has a minimum value.

According to the fourth embodiment of the present invention, the coefficient generation unit generates a temporary received signal having been subjected to phase shift by applying the group of coefficient values to the desired signal, compares the specific received signal with a candidate signal obtained by compensating the phase shift value of the temporary received signal stepwise by a predetermined unit value, and identifies the reception timing offset value of the specific received signals from the phase shift value at which an error between the specific received signal and the candidate signal has a minimum value.

More specifically, the present invention is applicable to a wireless communication apparatus provided with an adaptive array antenna (AAA). In this case, the signal processing unit is an AAA combining unit for combining a plurality of signal sequences received by the plurality of the antenna elements, and the group of coefficient values stored in the memory are weight values to be used in the AAA combining unit.

In the case where the present invention is applied to a wireless communication apparatus provided with MIMO (Multiple Input Multiple Output) antennas, the signal processing unit is a channel estimation unit for a plurality of signal sequences received by the plurality of the antenna elements, and the group of coefficient values stored in the memory are channel matrix values to be uses in the channel estimation unit.

The present invention is particularly effective for an OFDM wireless communication apparatus in which each of antenna elements receives orthogonal frequency division multiplexing (OFDM) signal and the received signal conversion units include a plurality of Fast Fourier Transform (FFT) units corresponding to the antenna elements.

Since a group of coefficient values necessary in the received signal processing are compensated by detecting reception timing offset values depending on the phase shift which appears in the received signals when reception timing of orthogonal modulation signals deviates, the base station according to the present invention can perform processing of received signals by applying adequate coefficient values compensated in accordance with the timing offset values even when a terminal station changes the transmission timing of an upward communication frame in response to a TA control signal transmitted from the base station and the reception timing of the upward communication frame deviates in a moment at the base station.

BRIEF DESCRIPTION OF THE DRAWINGS

FIGS. 17A and 17B show signal point constellations in the frequency region of signals received by first and second antennas, respectively;

FIG. 18 shows a signal point constellation of a combined signal in the case where the FFT window has no offset.

DETAILED DESCRIPTION OF THE PREFERRED EMBODIMENTS

Embodiments of the present invention will be described hereinafter with reference to the accompanying drawings.

Figure 1:
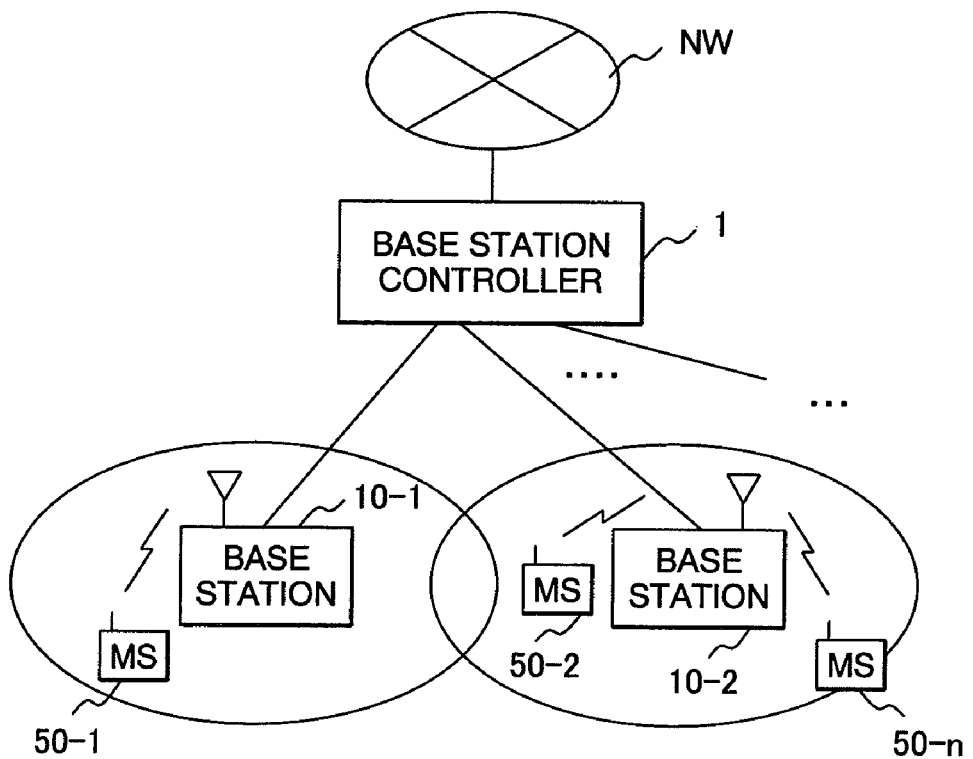
FIG. 1 is a view showing an example of a mobile wireless communication system to which the present invention is applied.

FIG. 1 shows an example of a mobile wireless communication system to which the present invention is applied.

The mobile wireless communication system shown here includes a base station controller 1 connected to a communication network NW, a plurality of base stations 10 (10-1, 10-2, . . . ) connected to the base station controller 1, and a plurality of mobile stations 50 (50-1, 50-2, . . . ). Each of the mobile stations (hereinafter referred to merely as a station) 50 communicates with the base station 10 located in a communication range through OFDMA. The station 50 is connected to the base station controller 1 via the base station 10 and communicates with another station, another communication apparatus or a server connected to the communication network NW.

Figure 2:
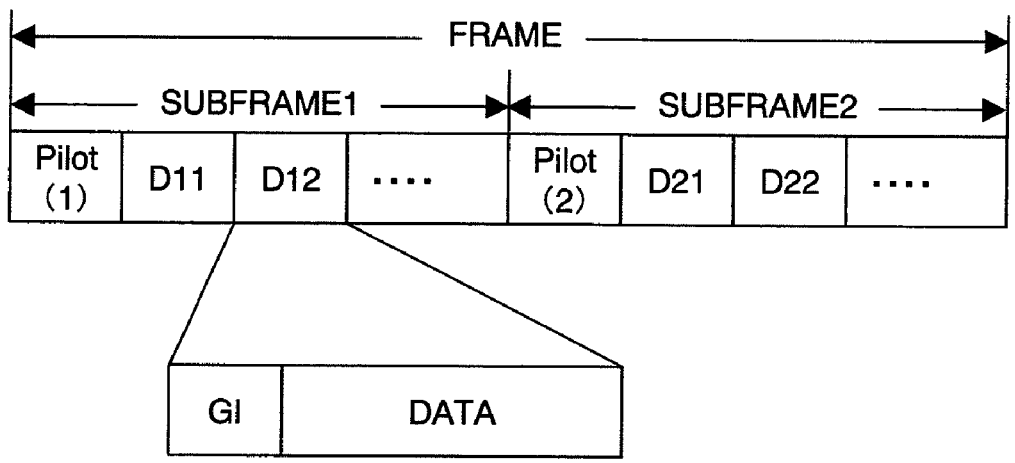
FIG. 2 is a view showing an example of an upward communication frame in a wireless section which is transmitted from each of terminal stations to a base station.

FIG. 2 shows an example of an upward communication frame in a wireless section which is transmitted from each of stations to the base station 10. The communication frame exemplified here comprises a plurality of sub-frames. Each of sub-frames comprises a synchronizing segment including a pilot signal, and a plurality of data segments following the synchronizing segment. In each data segment, a guard interval (GI) and data (OFDM symbols) are transmitted. Although a communication frame including only two sub-frames is shown here for the sake of simplification, each communication frame can include an arbitrary number of sub-frames.

Each of the stations 50 transmits the communication frame at a timing designated by the base station, using a sub-channel assigned from the base station. The base station executes time alignment control in the synchronizing segment at the head of the communication frame, for example. Further, the base station optimizes AAA weights recursively in the synchronizing segment of each of the sub-frames.

Figure 3:
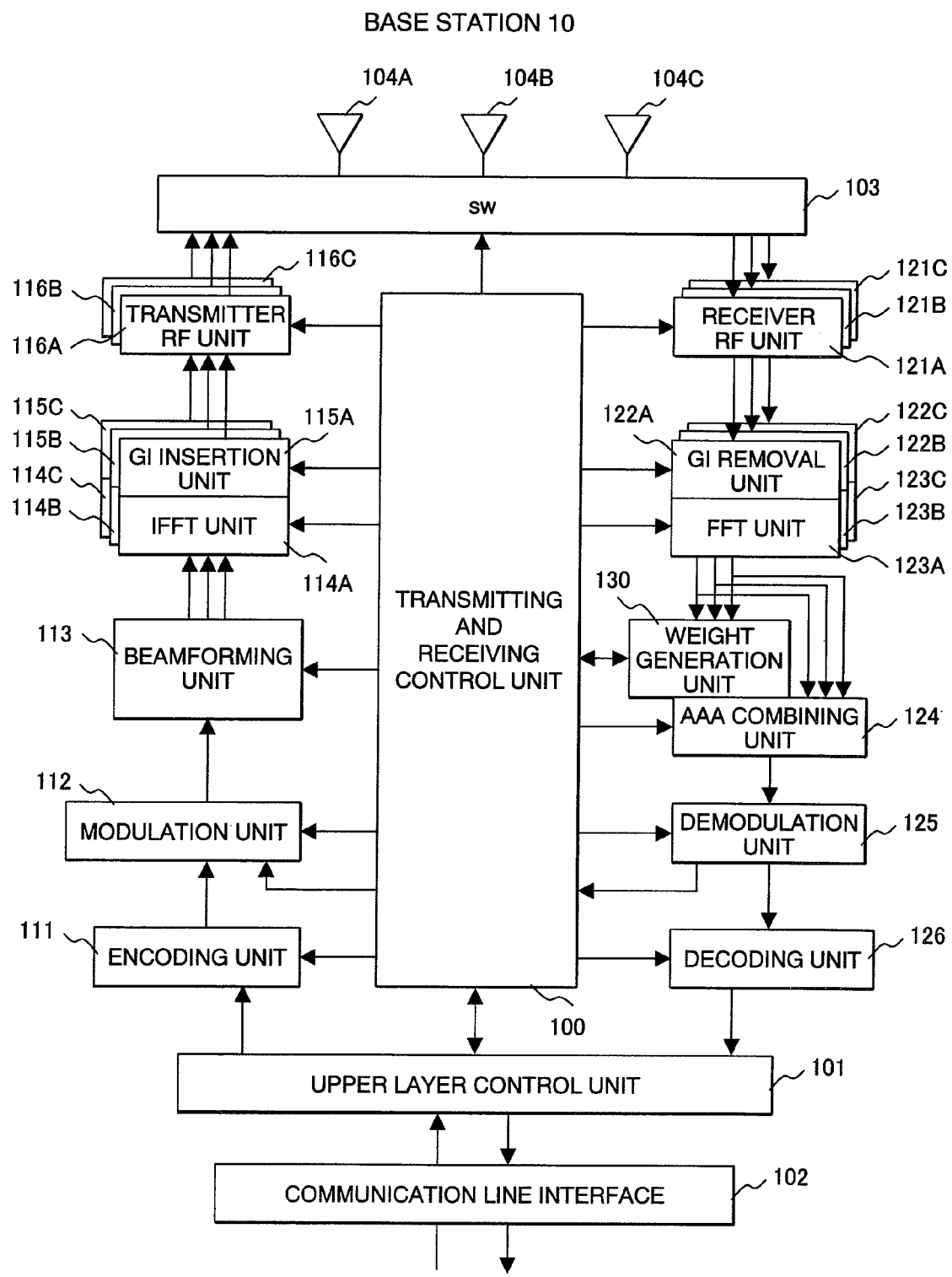
FIG. 3 is a block diagram showing an embodiment of a base station 10.

FIG. 3 is a block diagram showing an embodiment of the base station 10. The base station 10 comprises a transmitting and receiving control unit 100, an upper layer control unit 101, a communication line interface 102 for connecting to the base station controller 1, an array antenna including a plurality of antenna elements 104 (104A to 104C) connected to a transmission/reception changeover switch 103, and a transmission circuitry system and a reception circuitry system connected between the upper layer control unit 101 and the switch 103. Principal circuitry elements of the transmission circuitry system and the reception circuitry system are controlled by the transmitting and receiving control unit 100.

The transmission circuitry system will be described first. A packet received by the communication line interface 102 is transferred to the upper layer control unit 101 for performing protocol processing higher than a physical layer on the packet. Downward packet data outputted from the upper layer control unit 101 is encoded by an encoding unit 111 and inputted to a modulation unit 112. The modulation unit 112 converts the downward packet data having been encoded by the encoding unit 111, a TA control signal and other control signals supplied from the transmitting and receiving control unit 100 into complex symbols in accordance with a modulation method such as 16 QAM, for example.

Complex symbol sequence outputted from the modulation unit 112 is inputted to a beam-forming (BF) unit 113 and multiplied by respective weights corresponding to antenna elements in order to carry out transmission beam-forming depending on the position of a destination station. Conversion processing in the frequency region of OFDM is completed by the signal processing described above.

The complex symbol sequence having been weighted by the BF unit 113 is fed to a plurality of IFFT units 114 (114A to 114C) corresponding to the antenna elements 104A to 104C and converted into OFDM symbols each comprising a plurality of samples. After inserting a guard interval (GI) by GI insertion units 115 (115A to 115C), the OFDM symbols are inputted to transmitter RF units 116 (116A to 116C) corresponding to the antenna elements 104A to 104C. Each of the transmitter RF units 116 superimposes the OFDM baseband signal including the GI and the OFDM symbols upon a carrier frequency (RF), and outputs the RF signal to the switch 103 after amplifying the RF signal in power depending on the weight. The switch 103 connects the transmitter RF units 116 (116A to 116C) to the antenna elements 104 (104A to 104C) corresponding thereto during a data transmitting period, thereby to transmit the downward signal from the array antenna with directivity depending on the weighting.

Next, the reception circuitry system will be described.

In a receiving period, RF signals received by the antenna elements 104 are supplied to receiver RF units 121 (121A to 121C) via the switch 103. The receiver RF units 121 convert the received RF signals into OFDM baseband signals and outputs the OFDM baseband signals to GI removal units 122 (122A to 122C) in parallel. Each of the GI removal units 122 eliminates the guard interval from the OFDM baseband signal and outputs the OFDM symbols to one of FFT units 123 (123A to 123C). Each of the FFT units 123 converts the OFDM symbols into original complex symbols. Conversion processing in the time region is completed by the above signal processing and signal processing in the frequency region starts.

The complex symbols outputted from the FFT units 123 are inputted to an AAA combining unit 124 for performing adaptive array combining for each subcarrier. The output of the AAA combining unit 124 is inputted to a demodulation unit 125. The demodulation unit 125 demodulates its input signal according to a demodulation method corresponding to the modulation unit 112. Out of signal sequence demodulated by the demodulation unit 125, a control signal is supplied to the transmitting and receiving control unit 100, and upward data signals are supplied to a decoding unit 126. Bit sequence decoded by the decoding unit 126 is subjected to protocol processing by the upper layer control unit 101 and converted into upward packets. The upward packets are transferred to the base station controller 1 through the communication line interface 102.

A feature of the embodiment of the invention resides in that the reception circuitry system is provided with a weight generation unit 130 serving as a coefficient generator in association with the AAA combining unit 124 so that the weight generation unit 130 compensates weight values for use in the AAA combining unit 124 so as to be suitable values when the receiving timing of an upward frame deviates from the FFT window. The operation of the weight generation unit 130 will be described later in detail with reference to FIG. 6.

Figure 4:
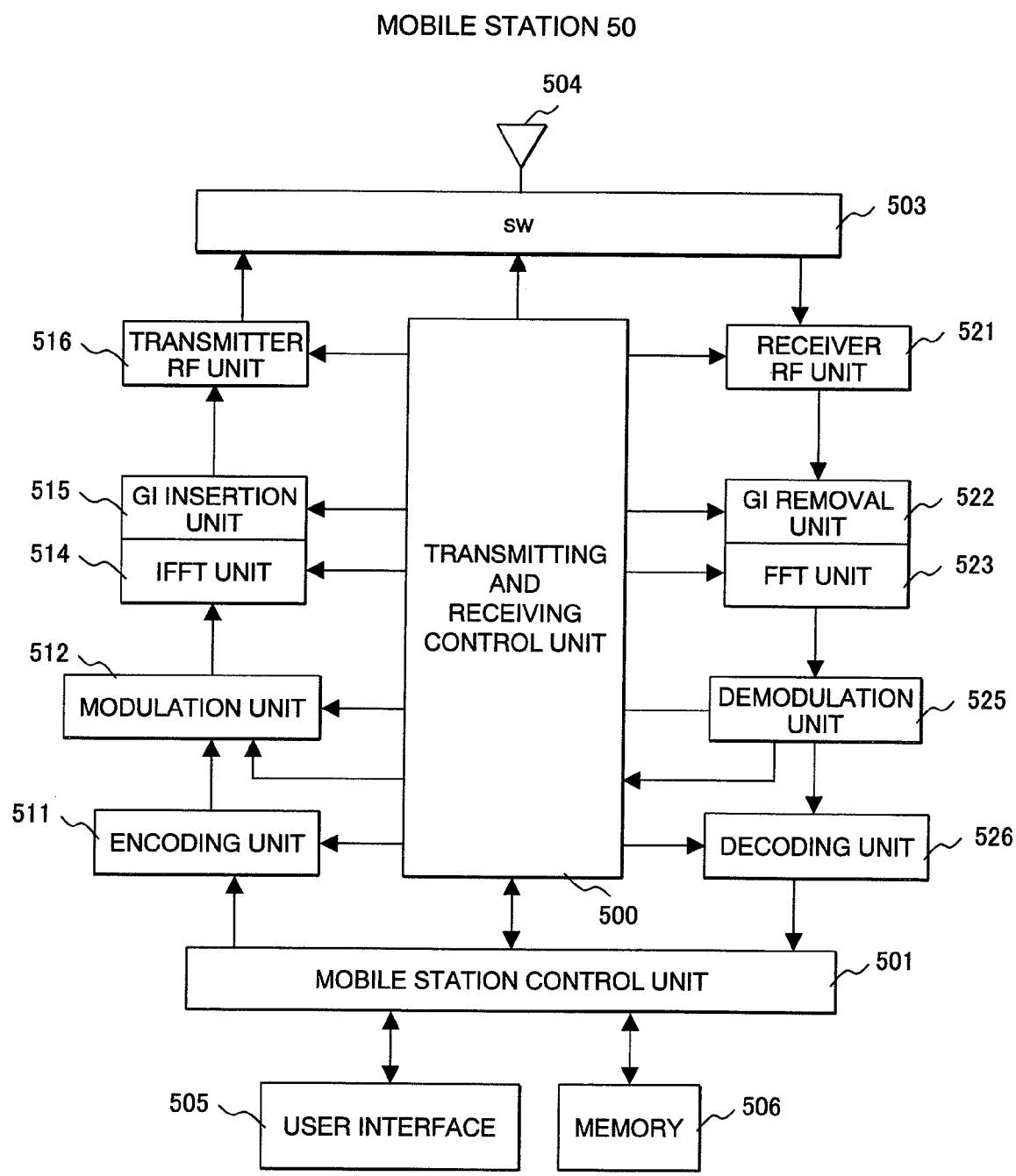
FIG. 4 is a block diagram showing an embodiment of a terminal station 50 for communicating with the base station 10 shown in FIG. 3.

FIG. 4 is a block diagram showing an embodiment of the station 50 for communicating with the base station 10 shown in FIG. 3.

The station 50 comprises a transmitting and receiving control unit 500, a mobile station control unit (processor) 501, an antenna 504 connected to a transmission/reception changeover switch 503, a user interface 505 and a memory 506 connected to the mobile station control unit 501, and a transmission circuitry system and a reception circuitry system connected between the mobile station control unit 501 and the switch 503. In the memory 506, various application programs to be executed by the mobile station control unit 501 are stored. In FIG. 4, various I/O devices to be provided in the station, such as a display screen, an input operation button, telephone microphone and speaker are represented by the user interface 505 for the sake of simplification.

The transmission circuitry system comprises an encoding unit 511 for encoding packet data inputted from the user interface 505 or the mobile station control unit 501, a modulation unit 512 for converting upward packet data encoded by the encoding unit 511 and upward control signals inputted from the transmitting and receiving control unit 500 into complex symbols according to a modulation method such as 16 QAM, an IFFT unit 514 for converting complex symbol sequence outputted from the modulation unit 512 into OFDM symbols, a GI insertion unit 515 for inserting a guard interval (GI) into the OFDM symbols, and a transmitter RF unit 516 for superimposing an OFDM baseband signal including the GI and the OFDM symbols upon a carrier frequency and outputting an RF signal after amplifying in power. The switch 503 connects the transmitter RF unit 516 to an antenna 504 during a data transmitting period.

In the present embodiment, a transmission signal spatially multiplexed by the adaptive array of the base station 10 is received by the single antenna 504. The signal received by the antenna 504 is supplied to the reception circuitry system via the switch 503 during a receiving period. The reception circuitry system comprises a receiver RF unit 521 for converting the reception signal from the antenna 504 into an OFDM baseband signal, a GI removal unit 522 for eliminating the guard interval from the OFDM baseband signal, an FFT unit 523 for converting OFDM symbols into original complex signals, a demodulation unit 525 for demodulating upward data signals from the complex signals outputted from the FFT unit 523, and a decoding unit 526 for decoding the demodulated upward data signal.

Packet data decoded by the decoding unit 526 is supplied to the mobile station control unit 501 and processed by an application program corresponding to the received packet. On the other hand, a downward control signal demodulated by the demodulation unit 525 is supplied to the transmitting and receiving control unit 500 which controls principal circuit elements of the reception circuitry system and the transmission circuitry system. Upon receiving a TA control signal from the base station 10, the transmitting and receiving control unit 500 changes the transmission timing of upward frames to the antenna 504 according to the TA control signal.

Next, the function of the weight generation unit 130 provided in the base station 10 according to the invention will be described with reference to FIGS. 4 to 9.

Figure 5:
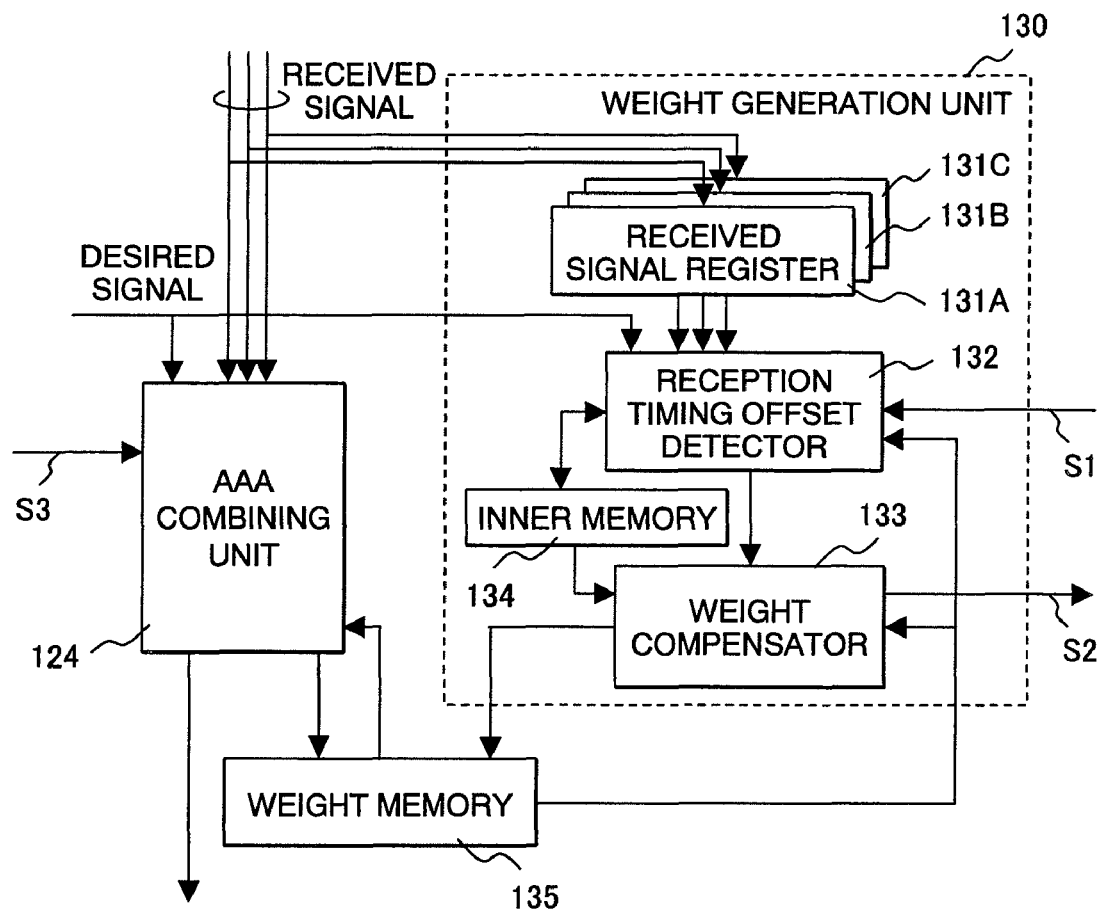
FIG. 5 is a view showing connective relationship among an AAA combining unit 124, a weight generation unit 130, and a weight memory 135 provided in the base station 10.

FIG. 5 shows connective relationship among the AAA combining unit 124, the weight generation unit 130, and a weight memory 135.

Figures 6, 7:
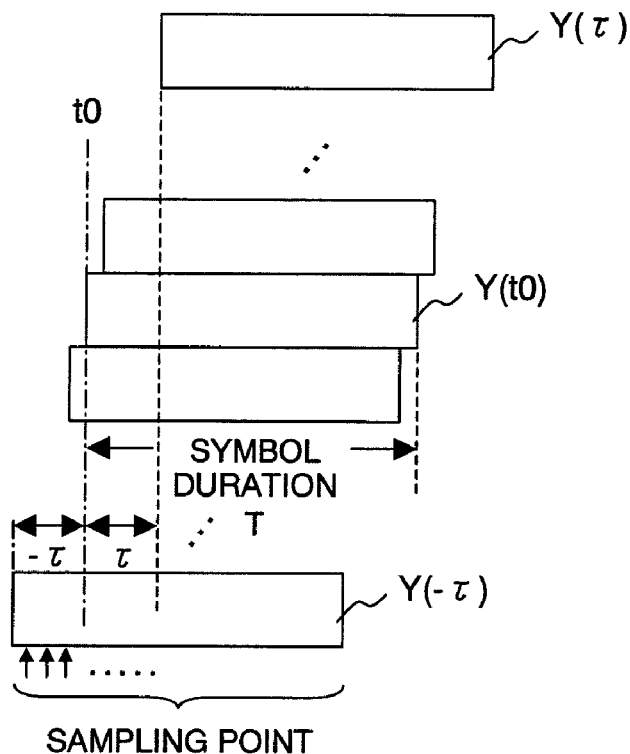
FIG. 6 shows offsets between a window position of an FFT unit 123 and signal reception timings.
FIG. 7 is a view showing structure of an AAA weight table stored in the weight memory 135.

The weight memory 135 stores a plurality of AAA weight table. Each AAA weight table 1350 includes a plurality of table entries EN01, EN02, ..., as shown in FIG. 7. Each of the table entries includes an antenna No. 1351 and indicates a set of weight values corresponding to subcarriers (f0 to fn) 1352. The AAA weight table 1350 is prepared for each user.

The weight generation unit 130 comprises a plurality of received signal registers 131 (131A to 131C) for storing received signals outputted from the FFT units 123 (123A to 123C), respectively, a reception timing offset detector 132, a weight compensator 133, and an inner memory 134. The weight compensator 133 compensates weight values stored in the weight memory 135 depending on the value of offset between the received signal and the FFT window detected by the reception timing offset detector 132.

The AAA combining unit 124 produces an AAA combined signal by performing AAA combining on the received signals from the FFT units 123 (123A to 123C) in accordance with weight values stored in the weight memory 135. The AAA combined signal is supplied to the demodulation unit 125. Further, the AAA combining unit 124 has a function of updating the weight values stored in the weight memory 135 according to a recursive algorithm, in response to a control signal S3 supplied from the transmitting and receiving control unit 100.

In the case where the number of receiving antennas of the base station 10 is M (M=3 in FIG. 3), weights of the c-th subcarrier indicated by one of AAA weight value tables in the weight memory 135 are $w(c)=[w1(c), w2(c), \ldots wM(c)]^H$, and received signals are $y(c)=[y1(c), y2(c), \ldots yM(c)]^T$, the AAA combining unit 124 outputs an AAA combined signal s(c) represented by the following expression:

$$s(c) = w(c)^H y(c) \quad (3)$$

Here, $[\ ]^T$ indicates matrix inversion, and $[\ ]^H$ represents Hermitian inversion resulting in complex conjugate of the matrix $[\ ]^T$.

In the present embodiment, the transmitting and receiving control unit 100 issues a control signal S1 to the weight generation unit 130 at the reception timing of a pilot signal (Pilot(1)) in the first synchronizing segment of the upward communication frame shown in FIG. 2, and issues the control signal S3 to the AAA combining unit 124 at the reception timing of each of the second and subsequent pilot signals (Pilot(2), Pilot(3), ...) to instruct optimization of the respective weight values.

The reception timing offset detector 132 of the weight generation unit 130 reads out from the weight memory 135 in response to the control signal S1, weight values wi(j) (i=1 to M, j=1 to n) of a specific user indicated by the control signal S1 and stores the weight values into the inner memory 134. After that, the reception timing offset detector 132 detects the offset of the signal reception timing based on the weight values wi(j) stored in the inner memory 134, received signals yi(j) (i=1 to M, j=1 to n) read out from the registers 131 (131A to 131C), and a desired signal (pilot signal) supplied from the transmitting and receiving control unit 100, according to a procedure which will be described in detail with reference to FIGS. 8 and 10.

FIG. 6 shows offset between the window position of the FFT unit 123 and signal reception timing.

In FIG. 6, t0 indicates the reference timing of the window position of the FFT unit 123, and Y(t0) indicates a received symbol whose reception timing accords with the reference timing t0. The received symbol is composed of a plurality of samples (sampling points) as indicated by arrow heads at Y(-τ).

When the station 50 changes the transmission timing of an upward communication frame in response to the TA control signal transmitted from the base station 10, as a result, signal reception timing also changes suddenly at the base station and it becomes impossible for the AAA combining unit 124 to compensate the phase shift of received signals by the weight values used so far.

The reception timing offset detector 132 according to the present embodiment detects a sample position "v" corresponding to the reception timing offset, by assuming that reception timing at which the current weight value are valid is the reference timing t0, and by stepwise changing the weight values according to a reception timing offset value in the vicinity of the reference timing t0 within a range from -τ samples to +τ samples, and determining whether the phase shift can be compensated with the changed weight values. The weight compensator 133 calculates weight values correctable the phase shift of the received signal at the sample position "v" detected by the reception timing offset detector 132, and rewrites the contents of the weight memory 135.

Figure 8:
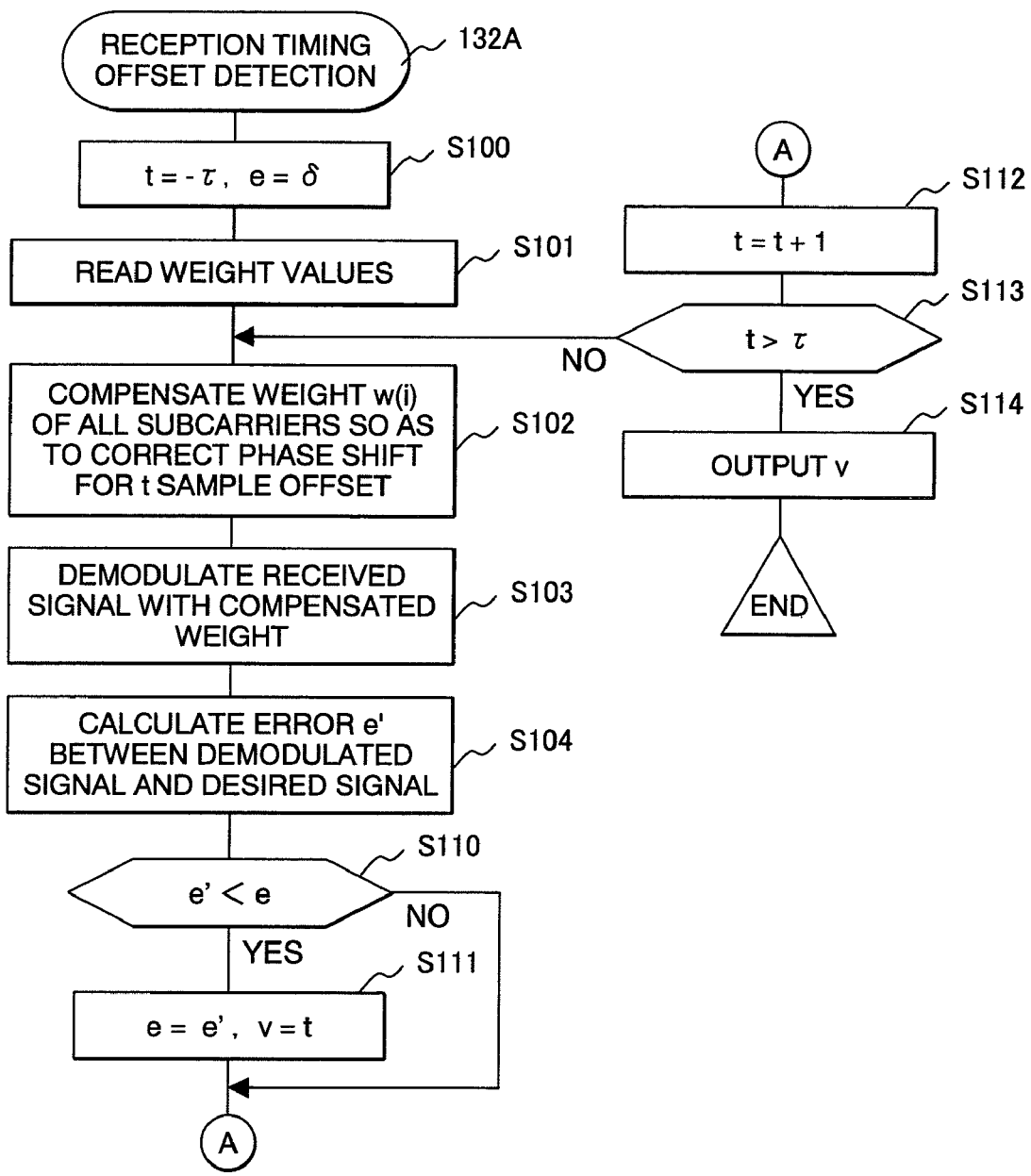
FIG. 8 is a flow chart showing reception timing offset detection 132A executed by a reception timing offset detector 132 according to the first embodiment of the invention.

FIG. 8 shows a flow chart of reception timing offset detection 132A executed by the reception timing offset detector 132 according to the first embodiment of the invention.

Upon receiving the control signal S1, the reception timing offset detector 132 sets an initial value [-τ] to a parameter "t" indicating a sample position, and sets an initial value δ to a parameter "e" indicating an error between a demodulated received signal and a desired signal (step S100), reads out weight values wi(j) (i=1 to M, j=1 to n) of all the subcarriers from the AAA weight table in the weight memory 135, which corresponds to a user designated by the control signal S1, and stores the weight values in the inner memory 134 (step S101). The initial value δ of the error "e" has a sufficiently large value, for example, 10 raised to the tenth power.

The reception timing offset detector 132 generates compensated weight values so as to correct phase shift which occurs when the received signals deviates by t samples, on the basis of the weight values wi(j) indicated by the inner memory 134 (step S102). In the case where w(c) stands for the weight of the c-th subcarrier, representing all the subcarriers and all the antenna elements, the value of compensated weight is expressed by the following expression:

$$w(c) \leftarrow \exp\left(-j\frac{2\pi tc}{L}\right)w(c) \quad (4)$$

The reception timing offset detector 132 demodulates the received signals with the compensated weight values to produce a demodulated signal to be a candidate signal (step S103), and calculates an error e' between the demodulated signal and a desired signal (step S104). The values of demodulated signal x'(c) and error e' for the c-th subcarrier are expressed by the following expressions, respectively:

$$x'(c) = w(c)^H y(c) \quad (5)$$

$$e' \leftarrow \sum_c |x(c) - x'(c)|^2 \quad (6)$$

The reception timing offset detector 132 compares the error e with the error e' (step S110), increments the value of parameter t (step S112) unless e<e', and compares t with τ (step S113). If the parameter t does not exceed the upper limit τ, the reception timing offset detector 132 returns to step S102 in order to repeat the above procedure by changing the value of candidate signal stepwise. If e<e' in step S110, the reception timing offset detector 132 executes the step S112 after setting e=e' and v=t (step S111). When t exceeds τ in step S113, the reception timing offset detector 132 outputs to the weight compensator 133 a sample offset value "v" at which the error e' between the demodulated signal and the desired signal has a minimum value (step S114), and completes the timing offset detection of this time.

Figure 19:
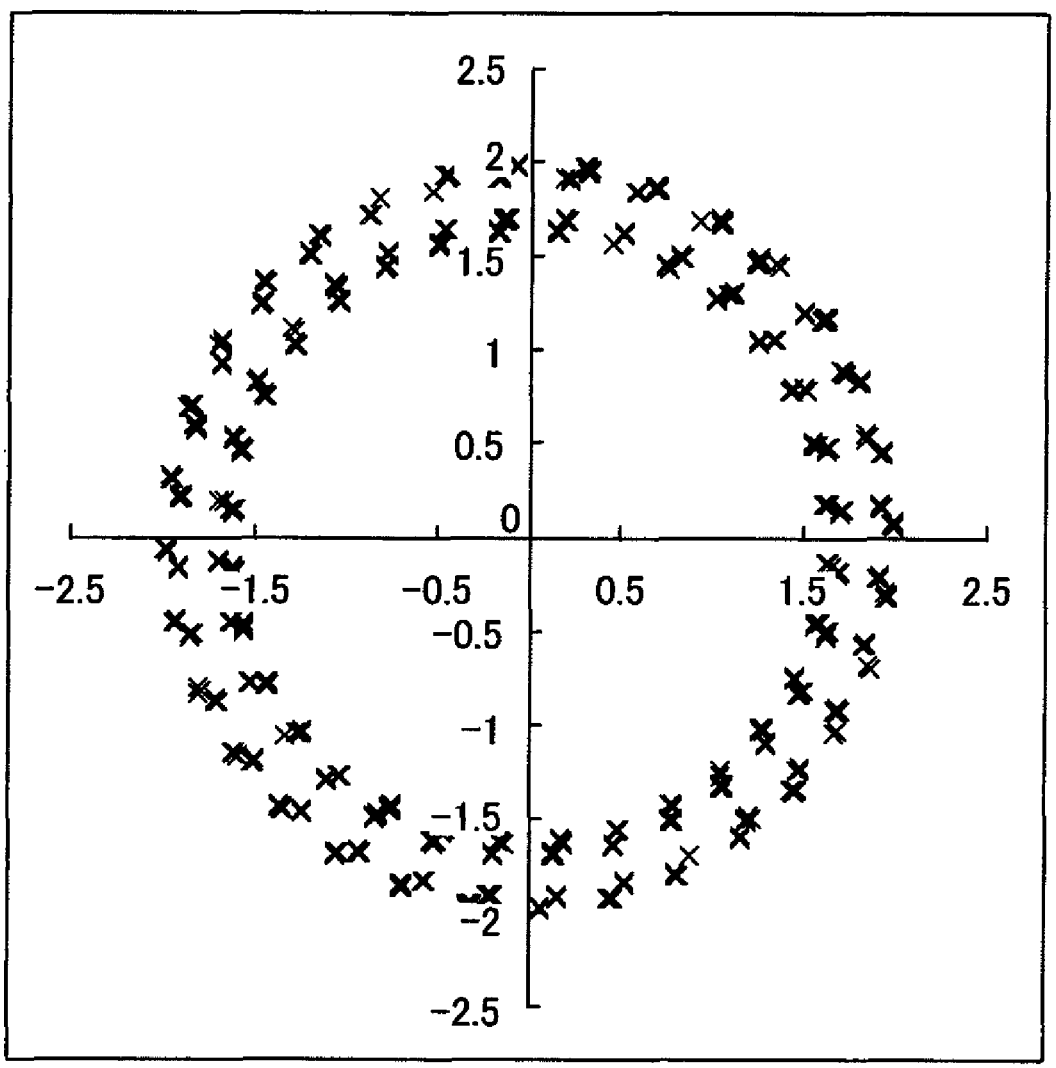
FIG. 19 shows a signal point constellation of a combined signal in the case where the FFT window has an offset.

By performing above operation, the reception timing offset detector 132 can find the sample offset value v at which the error e' between the demodulated signal and the desired signal has a minimum value, within a retrieval range between t0−τ and t0+τ, wherein the reference t0 is a reception timing corresponding to the weight values wi(j) read into the inner memory 134. In this case, the sample offset value v indicates the difference between the signal reception timing t0 at which the current weight values wi(j) are valid and reception timing of new signals read out from the register 131. In other words, the sample offset value v indicates the quantity of phase rotation (phase shift) having been described with reference to FIG. 19. The present embodiment takes advantage of the fact that the offset value of the reception timing becomes a constant multiple of a unitary phase shift value in each of subcarriers when the unitary phase shift value is represented by exp (−j2πt/L).

Figure 9:
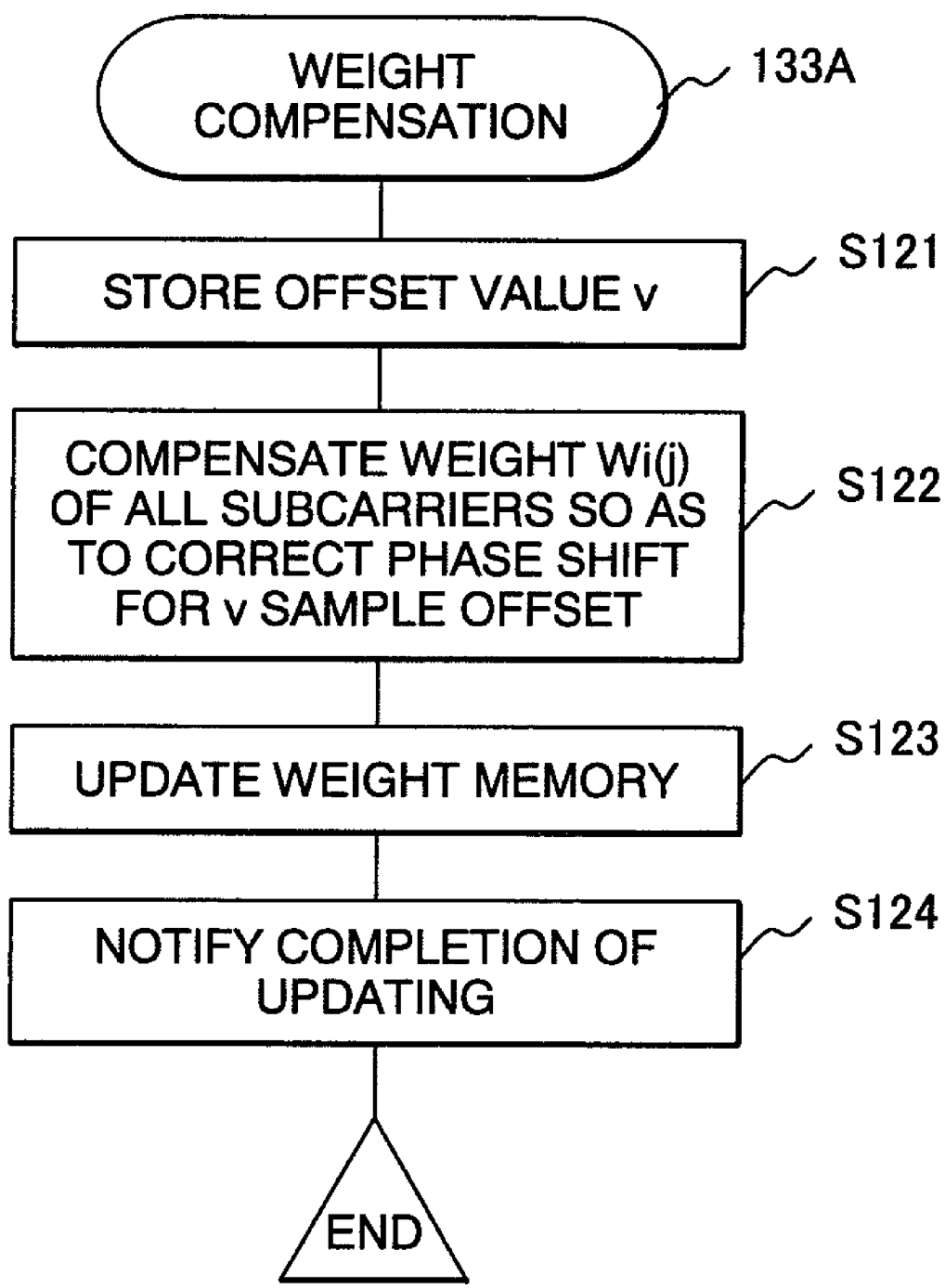
FIG. 9 is a flow chart showing weight compensation 133A executed by a weight compensator 133.

FIG. 9 is a flow chart of weight compensation 133A executed by the weight compensator 133.

The weight compensator 133 stores the sample offset value v inputted from the reception timing offset detector 132 (step S121), and compensates the current weight values wi(j) of all subcarriers stored in the inner memory 134 so as to correct phase shift that occurs when the reception timing of received signal shifts by v samples (step S122). In the case where w(c) stands for the weight values of the c-th subcarrier which represents all the subcarriers and all the antenna elements, compensated weight values are expressed by the following expression:

$$w(c) \leftarrow \exp\left(-j\frac{2\pi vc}{L}\right)w(c) \quad (7)$$

The weight compensator 133 updates the contents of the AAA weight table for a specific user stored in the weight memory 135, based on the compensated weight values (step S123), notifies the transmitting and receiving control unit 100 of the completion of updating (step S124: transmission of the control signal S2), and completes the processing of this time.

Figure 10:
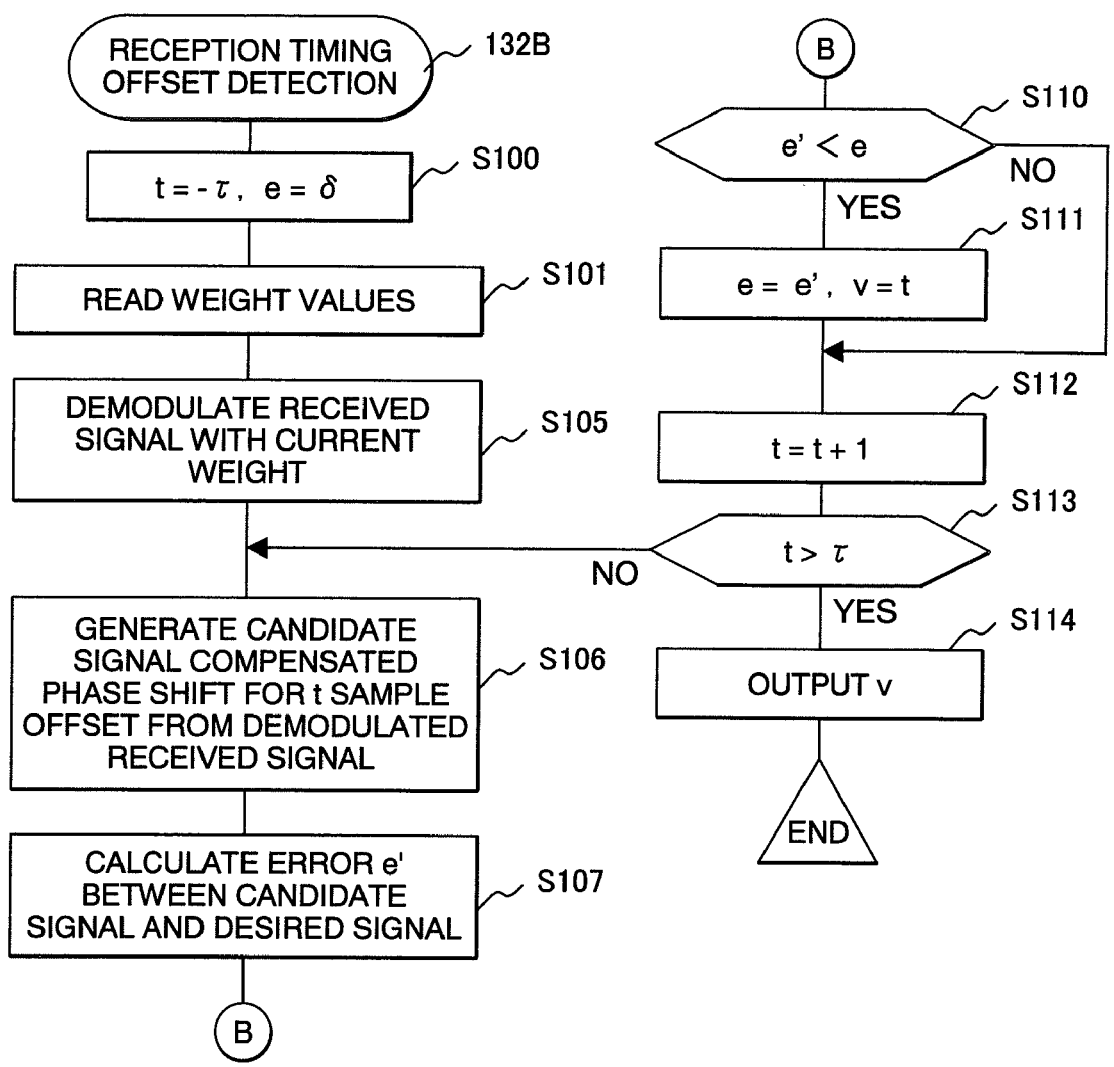
FIG. 10 is a flow chart showing reception timing offset detection 132A executed by the reception timing offset detector 132 according to the second embodiment of the invention.

FIG. 10 shows a flow chart of reception timing offset detection 132B executed by the reception timing offset detector 132 according to a second embodiment of the invention.

In the second embodiment, the reception timing offset detector 132 initializes the parameters t and e in response to the control signal S1 (step S100), and reads weight values from the weight memory 135 into the inner memory 134 (step S101). After that, the reception timing offset detector 132 demodulates received signals read out from the received signal registers 131A to 131C with the current weight values stored in the inner memory 134 to generate a test signal (step S105). The result of demodulation, namely, the test signal is stored in a predetermined area of the inner memory 134.

Next, the reception timing offset detector 132 generates, as a candidate signal u to be compared with a desired signal (the pilot signal), a signal having been compensated phase shift which occur when the received signal shifts from a reference by t samples, based on the demodulated received signal stored as the test signal (step S106).

The reception timing offset detector 132 calculates an error e' between the candidate signal u and the desired signal (step S107). In the case of the c-th subcarrier, for example, the error e' between the candidate signal u(c) and the desired signal is calculated by following expressions:

$$u(c) \leftarrow \exp\left(-j\frac{2\pi tc}{L}\right)x'(c) \quad (8)$$

$$e' \leftarrow \sum_c |x(c) - u(c)|^2 \quad (9)$$

Thereafter, the reception timing offset detector 132 detects a sample offset value v at which the error e' has a minimum value according to the procedure (steps S110 to S113) similar to FIG. 8, outputs the sample offset value v to the weight compensator 133 (step S114), and completes the timing offset detection of this time.

The second embodiment needs a storage area for storing the results of demodulation in the inner memory 134. As compared with the first embodiment, however, the second embodiment has the advantage of reducing the amount of operation because it can reduce the number of times of executing the first demodulation processing with the weights to once.

As indicated by the expression (5), the present invention is effective in the signal processing that requires coefficient values to be applied to reception signals, and its application range is not limited to the compensation of weight values for the adaptive array as described in the first and second embodiments of the invention.

Next, as another application example of the present invention, an embodiment in which the feature of the present invention is applied to channel estimation in a wireless communication system of MIMO (Multiple Input Multiple Output) scheme will be described with reference to FIGS. 11 to 16.

Figure 11:
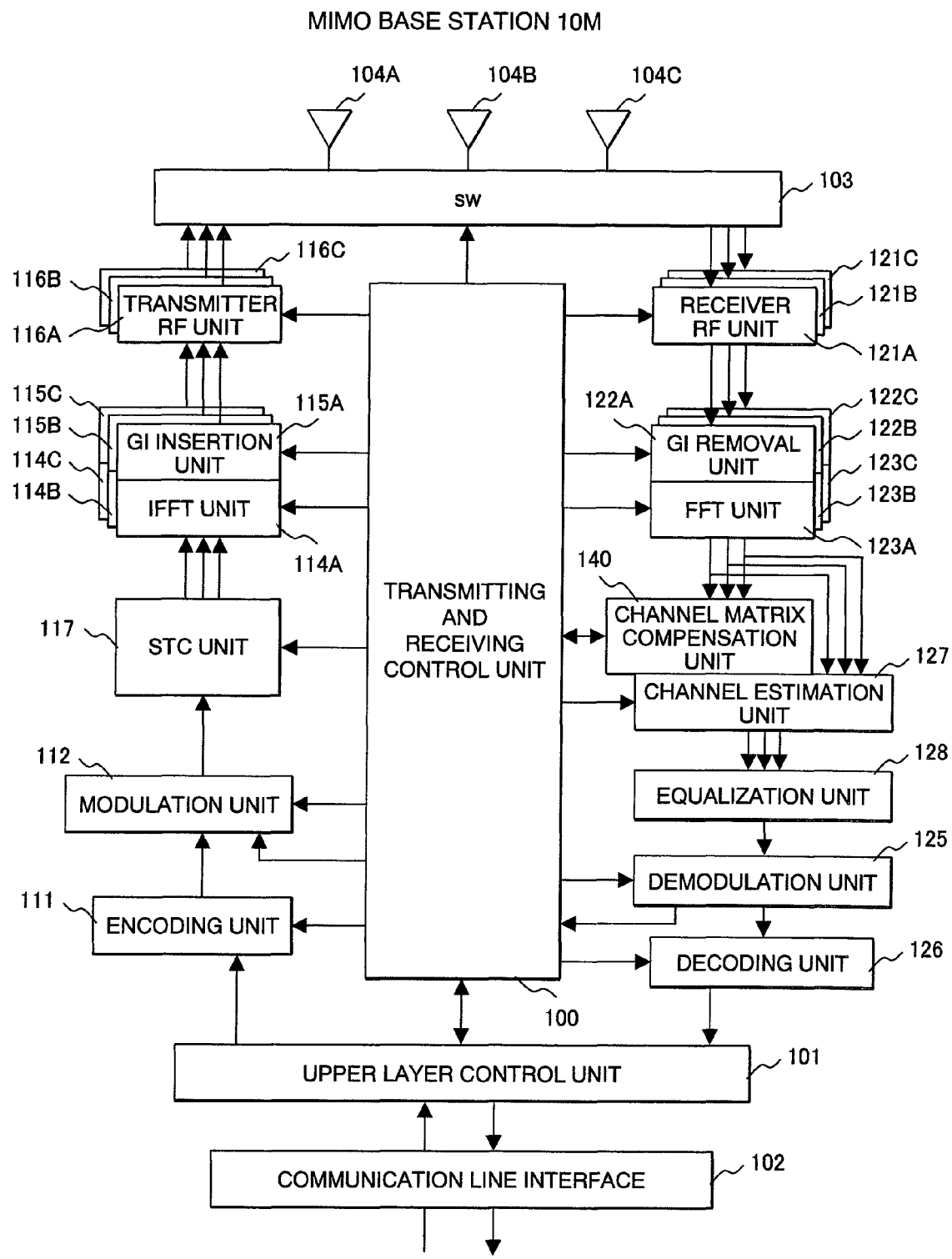
FIG. 11 is a block diagram showing an example of an MIMO base station 10M.

FIG. 11 is a block diagram showing an example of an MIMO base station 10M. Because the basic structure of MIMO base station is identical to the base station shown in FIG. 3, detailed description about constituents having the same reference numerals as those shown in FIG. 3 will be omitted.

In the transmission circuitry system of the MIMO base station 10M, the output signal of the modulation unit 112 is inputted to a STC (Space Time coding) unit 117, and an output signal of the STC unit 117 is supplied to a plurality of IFFT units 114 (111A to 114C) prepared so as to correspond to the antenna elements 104 (104A to 104C), respectively.

In the reception circuitry system of the MIMO base station 10M, output signals of the plurality of FFT units 123 (123A to 123C) corresponding to the antenna elements 104 (104A to 104C) are inputted to a channel estimation unit 127. The channel estimation unit 127 combines output signals from the FFT units 123 (123A to 123C) by using a channel matrix. An equalization unit 128 performs equalization processing on output signals from the channel estimation unit 127. An output signal from the equalization unit 128 is decoded by the decoding unit 126 after being demodulated by the demodulation unit 125.

The MIMO base station 10M according the present invention is characterized by a channel matrix compensation unit 140 provided as a coefficient value generation unit in association with the channel estimation unit 127. Operation of the channel matrix compensation unit 140 will be described in detail later.

Figure 12:
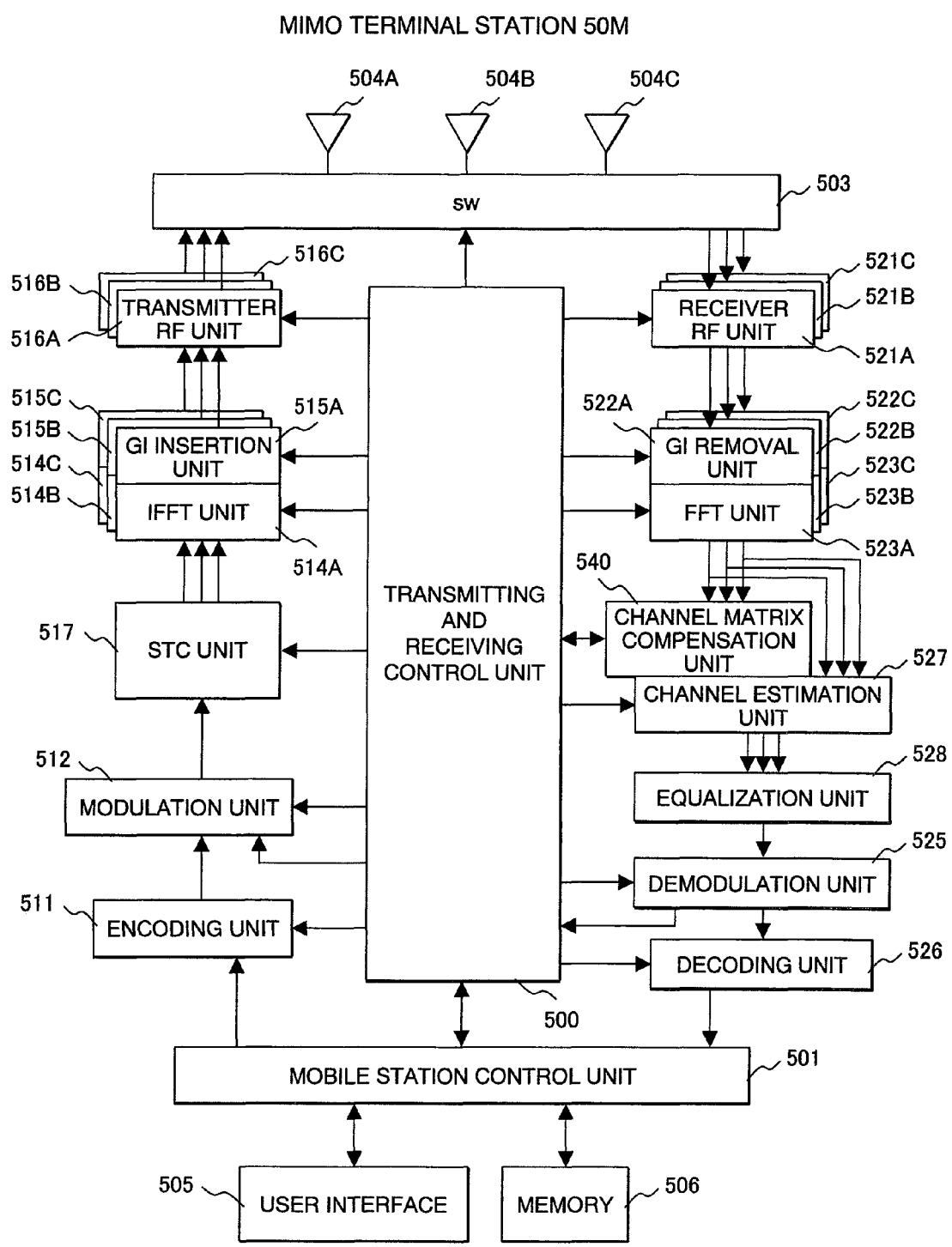
FIG. 12 is a block diagram showing an example of an MIMO terminal station 50M.

FIG. 12 is a block diagram showing an example of an MIMO terminal station 50M. Because the basic structure of MIMO terminal station is identical to the mobile station shown in FIG. 4, detailed description about constituents having the same reference numerals as those shown in FIG. 4 will be omitted.

The MIMO terminal station 50M has a plurality of antennas 504 (504A to 504C). The transmission circuitry system of the MIMO terminal station 50M includes a plurality of IFFT units 514 (514A to 514C), GI insertion units 515 (515A to 515C), and transmitter RF units 516 (516A to 516C), which are prepared so as to correspond to the antennas 504, respectively. In similar to the MIMO base station 10M, a STC unit 517 is connected to the modulation unit 512 of the transmission circuitry system. The output signal of the STC unit 517 is supplied to the plurality of the IFFT units 514 (514A to 514C).

The reception circuitry system of the MIMO terminal station 50M includes a plurality of receiver RF units 521 (521A to 521C), GI removal units 522 (522A to 522C) and FFT units 523 (523A to 523C), which are prepared so as to correspond to the antenna elements 504, respectively.

Output signals of the FFT units 523 (523A to 523C) are inputted to a channel estimation unit 527. The channel estimation unit 527 combines output signals from the FFT units 523 (523A to 523C) by using a channel matrix. An equalization unit 528 performs equalization processing on the output signal from the channel estimation unit 527. The output signal from the equalization unit 528 is decoded by a decoding unit 526 after being demodulated by the demodulation unit 525.

The MIMO terminal station 50M according to the invention is provided with a channel matrix compensation unit 540 provided in association with the channel estimation unit 527.

Figure 13:
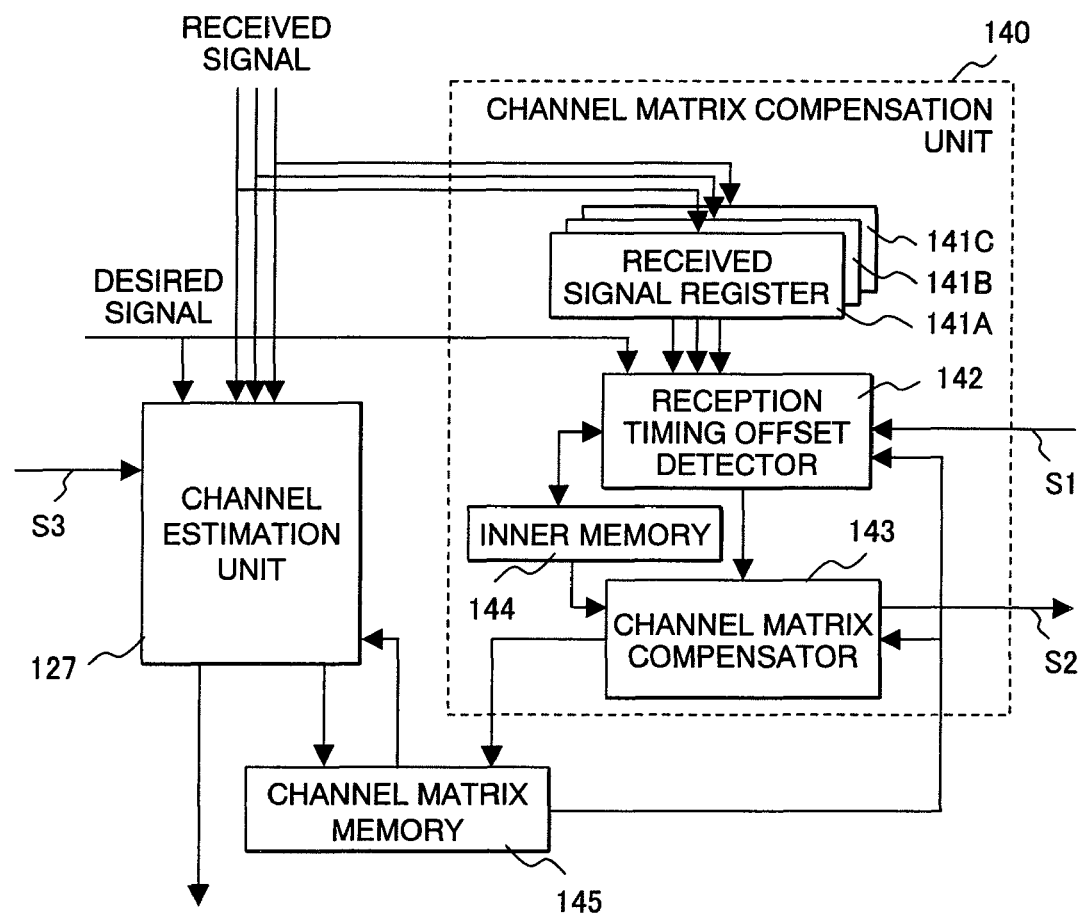
FIG. 13 is a view showing connective relationship among a channel estimation unit 127, a channel matrix compensation unit 140, and a channel matrix memory 145 provided in the MIMO base station 10M.

FIG. 13 shows connective relationship among the channel estimation unit 127, the channel matrix compensation unit 140, and a channel matrix memory 145, provided in the MIMO base station 10M. The channel matrix memory 145 stores a plurality of channel matrix value tables, each of which indicates channel matrix values hi=[hi1, hi2, . . . hiN]$^T$ for each of subcarriers (f0 to fn), in association with reception antenna No. i. Here, N represents the number of transmission antennas. The channel matrix value table is prepared for each user.

The channel matrix compensation unit 140 comprises a plurality of received signal registers 141 (141A to 141C) for storing the received signals outputted from the FFT units 123 (123A to 123C), a reception timing offset detector 142, a channel matrix compensator 143, and an inner memory 144. The channel matrix compensator 143 compensates the channel matrix values stored in the channel matrix memory 145 according to an offset value v of the FFT window, which is detected by the reception timing offset detector 142.

The channel estimation unit 127 combines the received signals inputted from the FFT units 123 (123A to 123C) according to the channel matrix values indicated by the channel matrix memory 145, and outputs a combined signal to the equalization unit 128. Further, the channel estimation unit 127 has the function of updating the channel matrix values stored in the channel matrix memory 145 according to a recursive algorithm, in response to the control signal S3 supplied from the transmitting and receiving control unit 100.

The reception timing offset detector 142 reads out channel matrix values of all subcarriers for a specific user indicated by the control signal S1, from the channel matrix memory 145 in response to the control signal S1 given from the transmitting and receiving control unit 100, and stores the channel matrix values into the inner memory 144. After that, the reception timing offset detector 142 detects the quantity of signal reception timing offset based on the channel matrix values stored in the inner memory 144, the received signals read out from the received signal registers 141 (141A to 141C), and a desired signal (pilot signal) supplied from the transmitting and receiving control unit 100, according to a procedure which will be described in detail with reference to FIGS. 14 and 16.

Figure 14:
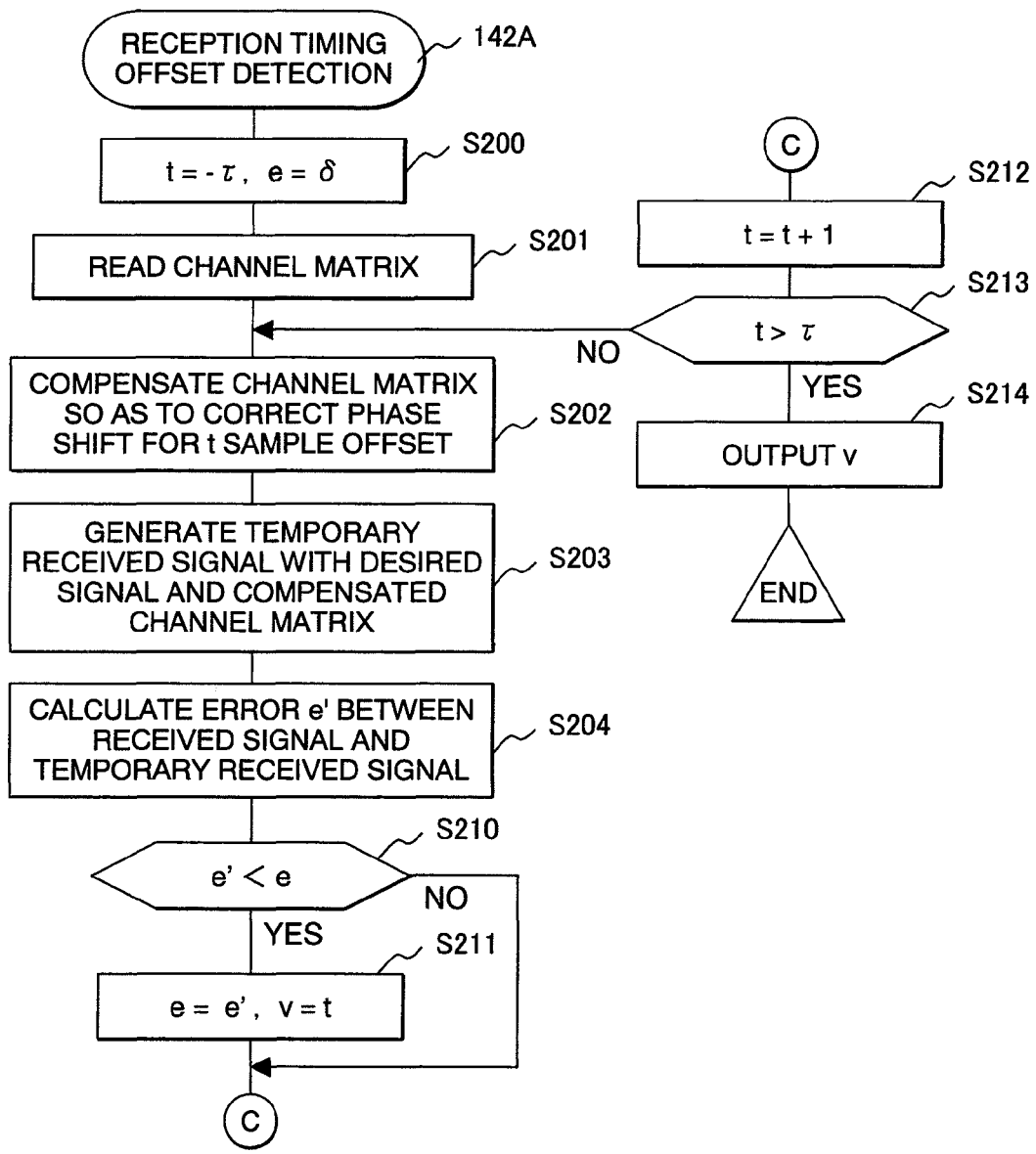
FIG. 14 is a flow chart showing reception timing offset detection 142A executed by the reception timing offset detector 142 according to the third embodiment of the invention.

FIG. 14 shows a flow chart of reception timing offset detection 142A executed by a reception timing offset detector 142 according to a third embodiment of the invention.

Upon receiving the control signal S1, the reception timing offset detector 142 sets an initial value [−τ] to a parameter "t" indicating a sample position, and sets an initial value δ to an error "e" between a received signal and a temporary received signal which is generated from a desired signal according to the channel matrix (step S200), reads out a channel matrix H(j)=[h1(j), h2(j), . . . h$_m$(j)]$^T$ for all the subcarriers from the channel matrix value table in the channel matrix memory 145, which correspond to a user designated by the control signal S1, and stores the channel matrix H(j) in the inner memory 144 (step S201). Here, M indicates reception antenna No., and j subcarrier No. The initial value 8 of the error "e" has a sufficiently large value, for example, 10 raised to the tenth power.

The reception timing offset detector 142 generates compensated channel matrix values so as to correct phase shift which occurs when the received signal y(i) deviates by t samples, on the basis of the channel matrix values indicated by the inner memory 144 (step S202). In the case where H(c)=[h1(c), h2(c), hM(c)]$^T$ (provided that hi=[hi1, hi2, . . .

hiN]$^T$) stands for the channel matrix of the c-th subcarrier having been read into the inner memory 144 from the channel matrix value table, representing all the subcarriers and all the antenna elements, the value of compensated channel matrix for the c-th subcarrier is expressed by the following expression:

$$H(c) \leftarrow \exp\left(-j\frac{2\pi tc}{L}\right)H(c) \qquad (10)$$

The reception timing offset detector 142 generates temporary received signals y'(i) for all subcarriers (i=0 to n) from the compensated channel matrix value H(c) and desired signals x(c)=[x1(c), 2(c), xM(c)]$^T$ (step S203), and calculates an error e' between the temporary received signals y'(i) and the received signals y(i) indicated by the registers 141A to 141C (step S204). The values of temporary received signal y'(c) and error e' for the c-th subcarrier are expressed by the following expressions, respectively:

$$y'(i) \leftarrow H(c)x(c) \qquad (11)$$

$$e' \leftarrow \sum_c |y(c) - y'(c)|^2 \qquad (12)$$

The reception timing offset detector 142 compares e with e' (step S210), increments the value of parameter t unless e<e' (step S212), and compares t with τ (step S213). If t does not exceed τ, the reception timing offset detector 142 returns to step S202 in order to repeat the above procedure using incremented parameter t.

If e<e' in step S210, the reception timing offset detector 142 executes step S212 after setting e=e' and v=t (step S211). When t exceeds τ in step S213, the reception timing offset detector 142 outputs to the channel matrix value compensator 143 the sample offset value v at which the error e' has a minimum value (step S214), and completes the timing offset detection of this time.

By performing above operation, the reception timing offset detector 142 can find the sample offset value v at which the error e' between the temporary received signal y'(i) and the received signal y(i) has a minimum value, within a retrieval range between t0–τ and t0+τ, wherein the reference t0 is a reception timing corresponding to channel matrix Hi(j) stored in the channel matrix memory 145. The sample offset value v indicates the difference between the signal reception timing of a preceding frame to which the channel matrix Hi(j) is applicable and reception timing of a new received signal read out from the registers 141. In other words, the sample offset value v indicates the value of phase shift. The present embodiment also takes advantage of the fact that the offset value of the reception timing becomes a constant multiple of a unitary phase shift value in each of subcarriers when the unitary phase shift value is represented by exp(–j2πt/L)

Figure 15:
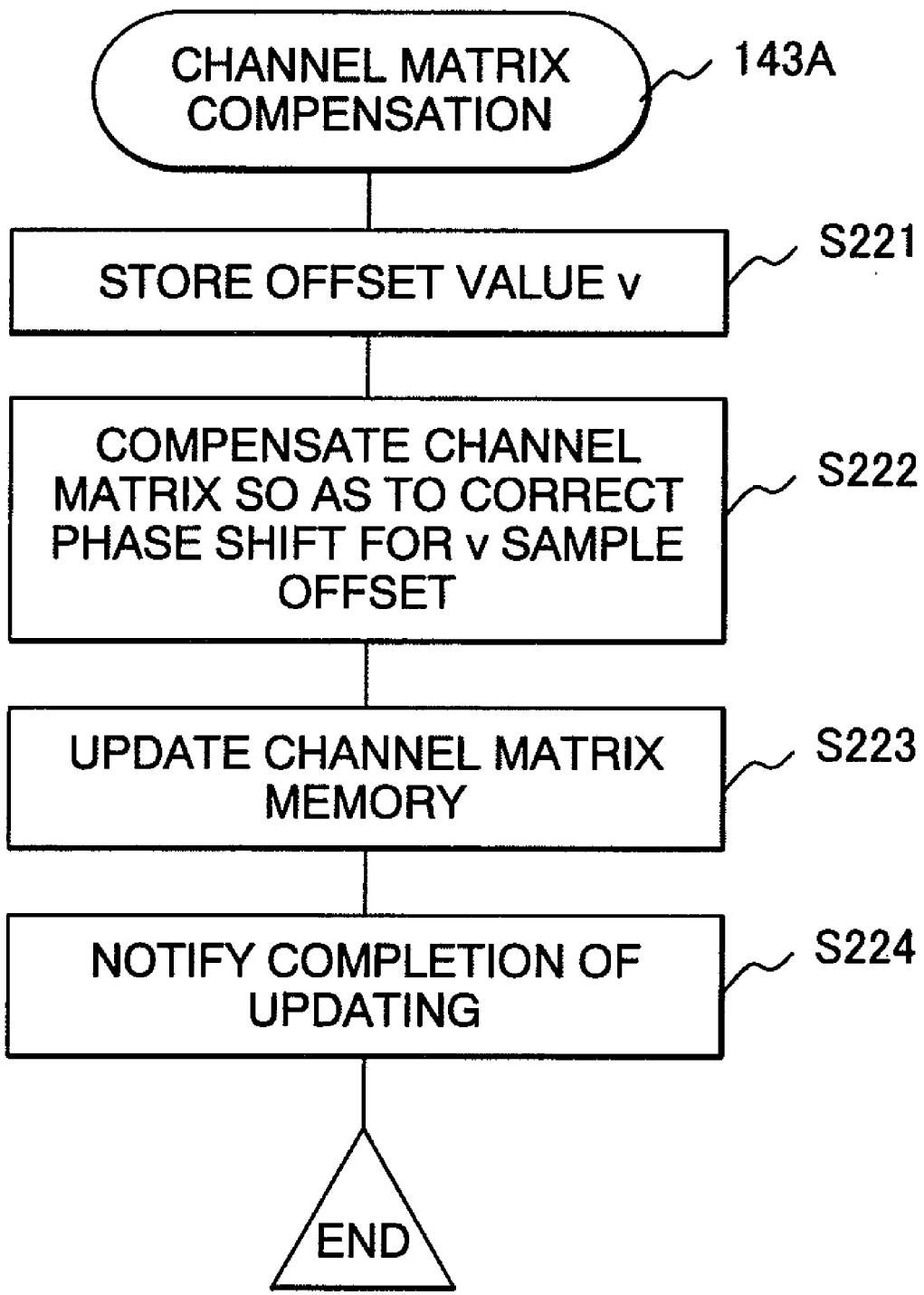
FIG. 15 is a flow chart showing channel matrix compensation 143A executed by a channel matrix value compensator 143.

FIG. 15 is a flow chart of channel matrix compensation 143A executed by the channel matrix value compensator 143.

The channel matrix value compensator 143 stores the sample offset value v inputted from the reception timing offset detector 142 (step S221), compensates the channel matrix Hi(j) stored in the inner memory 144 so as to correct phase shift that occurs when the reception timing of received signal y(i) shifts by v samples (step S222). In the case where H(c) stands for the channel matrix of the c-th subcarrier which represents all the subcarriers and all the antenna elements, compensated values of channel matrix H(c) is expressed by the following expression:

$$H(c) \leftarrow \exp\left(-j\frac{2\pi vc}{L}\right)H(c) \qquad (13)$$

The channel matrix compensator 143 updates the channel matrix values for a specific user stored in the channel matrix memory 145, based on the compensated values of channel matrix H(c) (step S223), notifies the transmitting and receiving control unit 100 of completion of updating (step S224: transmission of the control signal S2), and completes the processing of this time.

Figure 16:
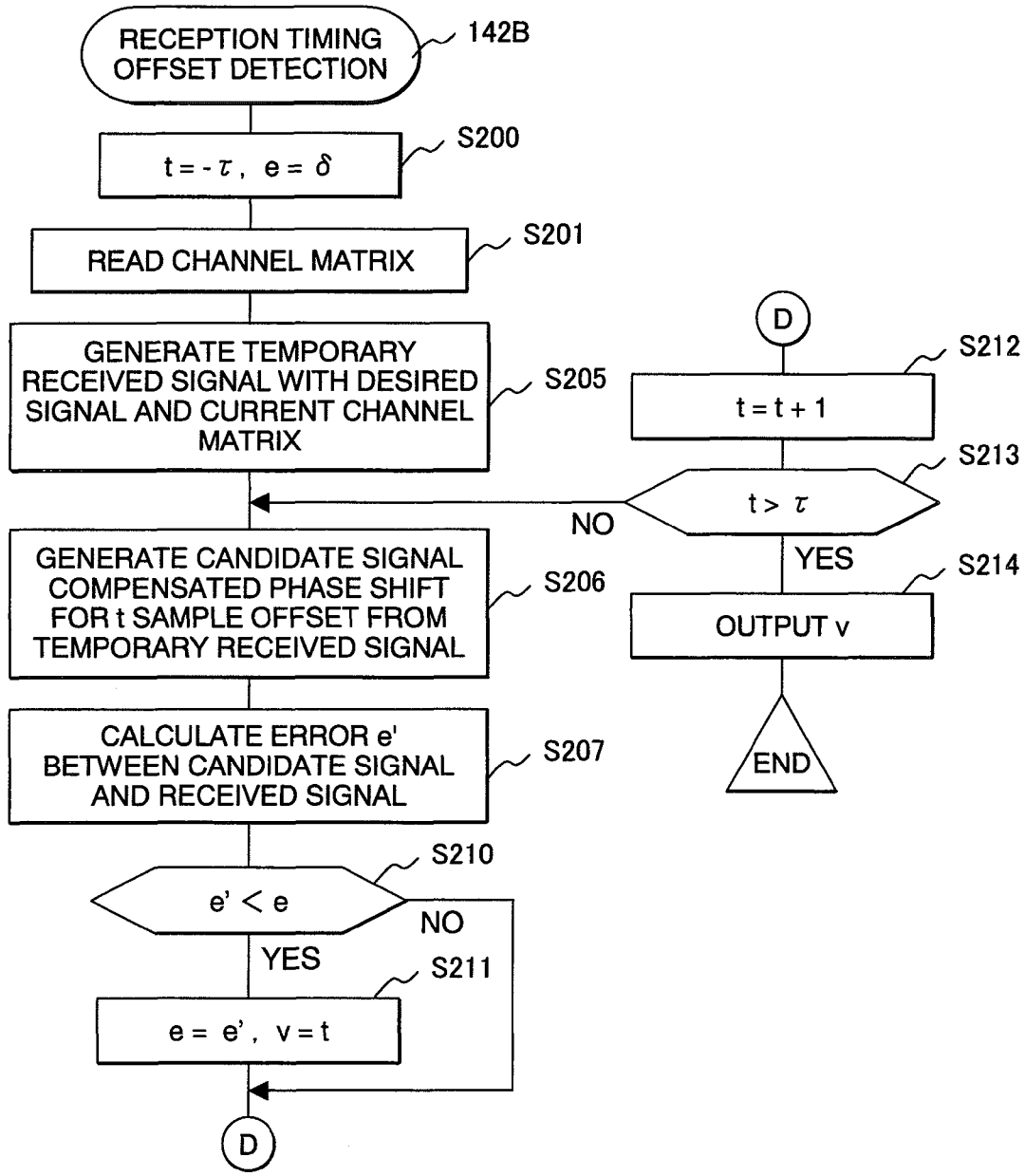
FIG. 16 is a flow chart showing reception timing offset detection 142B executed by a reception timing offset detector 142 according to the fourth embodiment of the invention.

FIG. 16 shows a flow chart of reception timing offset detection 142B executed by the reception timing offset detector 142 according to a fourth embodiment of the invention.

In the fourth embodiment of the invention, the reception timing offset detector 142 initializes the parameters t and e in response to the control signal S1 (step S200), and reads the channel matrix values from the channel matrix memory 145 into the inner memory 144 (step S201). After that, the reception timing offset detector 142 generates temporary received signals y'(i) for all subcarriers (i=1 to n) according to the expression (11), based on the current channel matrix H(i) indicated by the inner memory 144 and a desired signal x(i) (step S205). The temporary received signals y'(i) are stored in a predetermined area of the inner memory 144.

The reception timing offset detector 142 generates, from the temporary received signals y'(i), a candidate signal r(i) in which phase shift is compensated by assuming that the temporary received signals deviates by t sample (step S206), and calculates an error e' between the candidate signal r(i) and a received signal (step S207).

In the case of the c-th subcarrier, for example, the candidate signal r(c) and the error e' are calculated by following expressions, respectively:

$$r(c) \leftarrow \exp\left(-j\frac{2\pi tc}{L}\right)y'(c) \qquad (14)$$

$$e' \leftarrow \sum_c |y(c) - r(c)|^2 \qquad (15)$$

Thereafter, the reception timing offset detector 142 detects a sample offset value v at which the error e' has a minimum value according to the procedure (steps S210 to S213) similar to FIG. 14, outputs the sample offset value v to the channel matrix value compensator 143 (step S214), and completes the reception timing offset detection of this time.

The fourth embodiment needs a storage area for storing the temporary received signal generated at step S205 in the inner memory 144. As compared with the third embodiment, however, the fourth embodiment has the advantage of reducing the amount of operation because it is not necessary to repeat the processing for generating the temporary received signal more than one time.

Although the error e' is calculated as a square error (expression 6, the expression 9, the expression 12, the expression 15) in the embodiments, the present invention does not limit the expression for calculating the error e'. For example, the error e' may be calculated an absolute error.

As apparent from the above embodiments, a receiving station according to the present invention can compensate, by detecting reception timing offset (quantity of phase rotation or phase shift) of received signal, a group of coefficient values such as weights values and channel matrix values necessary in processing of the received signal, based on the detected reception timing offset. Accordingly, the present invention does not require high accuracy TA control between a transmitting station and a receiving station to synchronize the signal transmission timing with the FFT window on a receiving side strictly.

What is claimed is:

1. A wireless communication apparatus, comprising:
   a plurality of antenna elements for receiving orthogonal modulation signals as wireless signals;
   a plurality of received signal conversion units for converting the wireless signals received by said antenna elements into baseband received signals;
   a memory for storing a group of coefficient values necessary in processing of received signals outputted from said received signal conversion units;
   a coefficient generation unit for temporarily storing specific received signals outputted from said received signal conversion units, detecting an offset value of reception timing of the specific received signals on the basis of a desired signal already known and the group of the coefficient values read out from said memory, compensating the group of coefficient values according to the detected offset value of the reception timing, and storing the compensated coefficient values in said memory; and
   a signal processing unit for processing the received signals outputted from said received signal conversion units by applying the compensated coefficient values stored in said memory,
   wherein said coefficient generation unit detects a phase shift value of said specific received signals, and identifies the offset value of the reception timing from the phase shift value; and
   wherein said coefficient generation unit changes a phase shift value which is variable depending on the offset value of the reception timing, by a predetermined unit value within a predetermined range, compensates said group of coefficient values stepwise in accordance with the phase shift value, compares said desired signal with a candidate signal obtained by applying the compensated coefficient value to the specific received signals, and identifies the reception timing offset value of said specific received signals from the phase shift value at which an error between the desired signal and the candidate signal has a minimum value.

2. A wireless communication apparatus comprising:
   a plurality of antenna elements for receiving orthogonal modulation signals as wireless signals;
   a plurality of received signal conversion units for converting the wireless signals received by said antenna elements into baseband received signals;
   a memory for storing a group of coefficient values necessary in processing of received signals outputted from said received signal conversion units;
   a coefficient generation unit for temporarily storing specific received signals outputted from said received signal conversion units, detecting an offset value of reception timing of the specific received signals on the basis of a desired signal already known and the group of the coefficient values read out from said memory, compensating the group of coefficient values according to the detected offset value of the reception timing, and storing the compensated coefficient values in said memory; and
   a signal processing unit for processing the received signals outputted from said received signal conversion units by applying the compensated coefficient values stored in said memory,
   wherein said coefficient generation unit detects a phase shift value of said specific received signals, and identifies the offset value of the reception timing from the phase shift value; and
   wherein said coefficient generation unit generates a test signal having been subjected to phase shift by applying said group of coefficient values to said specific received signals, compares the desired signal with a candidate signal obtained by compensating the phase shift value of the test signal stepwise by a predetermined unit value, and identifies the reception timing offset value of said specific received signals from the phase shift value at which an error between the desired signal and the candidate signal has a minimum value.

3. The wireless communication apparatus according to one of claims 1 and 2,
   wherein said plurality of antenna elements form an adaptive array antenna (AAA),
   said signal processing unit is an AAA combining unit for combining a plurality of signal sequences received by the plurality of the antenna elements, and
   said group of coefficient values stored in said memory are weight values to be used in said AAA combining unit.

4. The wireless communication apparatus according to claim 1, wherein
   said plurality of antenna elements form an adaptive array antenna (AAA),
   said signal processing unit is an AAA combining unit for combining a plurality of signal sequences received by the plurality of the antenna elements,
   said group of coefficient values stored in said memory are weight values to be used in said AAA combining unit, and
   said coefficient generation unit compensates the phase shift value of said specific received signal by applying said group of the coefficient values having been compensated stepwise, and generates said candidate signal by modulating the compensated received signal.

5. The wireless communication apparatus according to claim 2, wherein
   the plurality of the antenna elements form an adaptive array antenna (AAA),
   said signal processing unit is an AAA combining unit for combining a plurality of signal sequences received by the plurality of the antenna elements,
   the group of the coefficient values stored in said memory are weight values to be used in said AAA combining unit, and
   said coefficient generation unit generates a demodulated signal by demodulating said specific received signal, generates said test signal having been subjected to phase shift by applying a group of weight values to the demodulated signal, and generates said candidate signal by compensating a phase shift value of the test signal stepwise by a predetermined unit value.

6. A wireless communication apparatus comprising:
   a plurality of antenna elements for receiving orthogonal modulation signals as wireless signals;
   a plurality of received signal conversion units for converting the wireless signals received by said antenna elements into baseband received signals;
   a memory for storing a group of coefficient values necessary in processing of received signals outputted from said received signal conversion units;

a coefficient generation unit for temporarily storing specific received signals outputted from said received signal conversion units, detecting an offset value of reception timing of the specific received signals on the basis of a desired signal already known and the group of the coefficient values read out from said memory, compensating the group of coefficient values according to the detected offset value of the reception timing, and storing the compensated coefficient values in said memory; and a signal processing unit for processing the received signals outputted from said received signal conversion units by applying the compensated coefficient values stored in said memory, wherein said coefficient generation unit detects a phase shift value of said specific received signals, and identifies the offset value of the reception timing from the phase shift value; and wherein said coefficient generation unit changes a phase shift value which is variable depending on the offset value of the reception timing, by a predetermined unit value within a predetermined range, compensates said group of coefficient values stepwise in accordance with the phase shift value, compares said specific received signal with a temporary received signal obtained by applying the compensated coefficient values to said desired signal, and identifies the reception timing offset value of said specific received signals from the phase shift value at which an error between the desired signal and the temporary received signal has a minimum value.

7. A wireless communication apparatus comprising:

a plurality of antenna elements for receiving orthogonal modulation signals as wireless signals;

a plurality of received signal conversion units for converting the wireless signals received by said antenna elements into baseband received signals;

a memory for storing a group of coefficient values necessary in processing of received signals outputted from said received signal conversion units;

a coefficient generation unit for temporarily storing specific received signals outputted from said received signal conversion units, detecting an offset value of reception timing of the specific received signals on the basis of a desired signal already known and the group of the coefficient values read out from said memory, compensating the group of coefficient values according to the detected offset value of the reception timing, and storing the compensated coefficient values in said memory; and a signal processing unit for processing the received signals outputted from said received signal conversion units by applying the compensated coefficient values stored in said memory, wherein said coefficient generation unit detects a phase shift value of said specific received signals, and identifies the offset value of the reception timing from the phase shift value; and wherein said coefficient generation unit generates a temporary received signal having been subjected to phase shift by applying said group of coefficient values to said desired signal, compares said specific received signals with a candidate signal obtained by compensating the phase shift value of the temporary received signal stepwise by a predetermined unit value, and identifies the reception timing offset value of said specific received signals from the phase shift value at which an error between the specific received signal and the candidate signal has a minimum value.

8. The wireless communication apparatus according to one of claims 6 and 7, wherein said plurality of antenna elements are MIMO (Multiple Input Multiple Output) antennas;

said signal processing unit is a channel estimation unit for a plurality of signal sequences received by the plurality of the antenna elements, and said group of coefficient values stored in said memory are channel matrix values to be uses in said channel estimation unit.

9. The wireless communication apparatus according to one of claims 1, 2, 6 and 7, wherein said orthogonal modulation signals received by said antenna elements are orthogonal frequency division multiplexing (OFDM) signals, and each of said received signal conversion units includes a Fast Fourier Transform (FFT) unit corresponding to one of said antenna elements, and the received signal conversion unit outputs a complex OFDM baseband signal as said baseband received signal.

10. The wireless communication apparatus according to one of claims 1, 2, 6 and 7, wherein each of said specific received signals is a pilot signal included at the head of a wireless communication frame transmitted as said orthogonal modulation signal.

* * * * *